(12) United States Patent
Campbell et al.

(10) Patent No.: US 6,773,527 B2
(45) Date of Patent: Aug. 10, 2004

(54) METHOD FOR OBTAINING IMPROVED ULTRASONIC BOND STRENGTH

(75) Inventors: Stephen Michael Campbell, Winneconne, WI (US); Kile Patrick Mangan, Appleton, WI (US); Mark Michael Mleziva, Appleton, WI (US); Kent Allan Franklin, Appleton, WI (US); Adrian Roy Eggen, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 88 days.

(21) Appl. No.: 10/113,798

(22) Filed: Apr. 1, 2002

(65) Prior Publication Data

US 2003/0188819 A1 Oct. 9, 2003

(51) Int. Cl.[7] .............................................. B29C 65/08
(52) U.S. Cl. ................. 156/73.1; 156/580.1; 156/580.2
(58) Field of Search ........................ 156/73.1, 82, 272.2, 156/272.8, 309.9, 379.6, 379.8, 379.9, 497, 499, 555, 580, 580.1, 580.2, 581, 582, 583.1

(56) References Cited

U.S. PATENT DOCUMENTS

| | | |
|---|---|---|
| 3,338,992 A | 8/1967 | Kinney |
| 3,341,394 A | 9/1967 | Kinney |
| 3,405,024 A | 10/1968 | Attwood et al. |
| 3,502,538 A | 3/1970 | Petersen |
| 3,502,763 A | 3/1970 | Hartmann |
| 3,542,615 A | 11/1970 | Dobo et al. |
| 3,692,618 A | 9/1972 | Dorschner et al. |
| 3,733,238 A | 5/1973 | Long et al. |
| 3,802,817 A | 4/1974 | Matsuki et al. |
| 3,849,241 A | 11/1974 | Butin et al. |
| 3,855,046 A | 12/1974 | Hansen et al. |
| 4,187,768 A | 2/1980 | Suzuki |
| 4,305,897 A | 12/1981 | Hazama et al. |
| 4,340,563 A | 7/1982 | Appel et al. |
| 4,414,045 A | 11/1983 | Wang et al. |
| 4,515,651 A | 5/1985 | MacLaughlin et al. |
| 4,663,220 A | 5/1987 | Wisneski et al. |
| 4,704,116 A | 11/1987 | Enloe |
| 4,713,132 A | 12/1987 | Abel et al. |
| 4,747,894 A | * 5/1988 | Johnston et al. ............ 156/73.1 |
| 4,909,870 A | 3/1990 | Gould et al. |
| 4,940,464 A | 7/1990 | Van Gompel et al. |
| 5,046,272 A | 9/1991 | Vogt et al. |
| 5,059,277 A | * 10/1991 | Willhite, Jr. et al. ..... 156/580.1 |
| 5,091,036 A | * 2/1992 | Taylor ..................... 156/379.6 |
| 5,096,532 A | 3/1992 | Neuwirth et al. |
| 5,104,116 A | 4/1992 | Pohjola |
| 5,110,403 A | 5/1992 | Ehlert |
| 5,114,509 A | * 5/1992 | Johnston et al. ........... 156/73.1 |
| 5,135,592 A | 8/1992 | Melvin |

(List continued on next page.)

FOREIGN PATENT DOCUMENTS

| | | |
|---|---|---|
| DE | 197 52 648 C1 | 3/1999 |
| DE | 199 06 873 A1 | 8/2000 |
| DE | 101 22 802 A1 | 10/2002 |
| EP | 217 032 | 4/1987 |
| EP | 1 112 823 A2 | 7/2001 |
| EP | 1 283 294 A2 | 8/2002 |
| FR | 2 628 030 A1 | 9/1989 |
| JP | 01061228 | 3/1989 |
| WO | 01/26595 | 4/2001 |
| WO | 01/88245 | 11/2001 |

Primary Examiner—James Sells
(74) Attorney, Agent, or Firm—Pauley Petersen & Erickson

(57) ABSTRACT

A method for ultrasonically bonding thermoplastic materials, for example melt-compatible thermoplastic materials, wherein the thermoplastic materials are preheated prior to entering an ultrasonic bonding means, thereby substantially increasing an ultimate bond strength established between the materials during the ultrasonic bonding process.

32 Claims, 15 Drawing Sheets

U.S. PATENT DOCUMENTS

| | | |
|---|---|---|
| 5,224,405 A | 7/1993 | Pohjola |
| 5,226,992 A | 7/1993 | Morman |
| 5,385,775 A | 1/1995 | Wright |
| 5,421,924 A | 6/1995 | Ziegelhoffer et al. |
| 5,545,275 A | 8/1996 | Herrin et al. |
| 5,562,790 A | 10/1996 | Ehlert et al. |
| 5,618,365 A | 4/1997 | Rebeyrolle et al. |
| 5,667,608 A | 9/1997 | Rajala et al. |
| 5,733,411 A | 3/1998 | Bett |
| 5,788,797 A | 8/1998 | Herrin et al. |
| 5,834,081 A | 11/1998 | Fanti |
| 5,840,147 A | 11/1998 | Grimm |
| 5,846,377 A | 12/1998 | Frantz et al. |
| 5,906,877 A | 5/1999 | Popper et al. |
| 6,003,582 A | 12/1999 | Blohowiak et al. |
| 6,009,925 A | 1/2000 | Hall et al. |
| 6,019,271 A | 2/2000 | Hayden et al. |
| 6,165,298 A | 12/2000 | Samida et al. |
| 6,200,399 B1 * | 3/2001 | Thielman .................. 156/73.1 |

* cited by examiner

METHOD FOR OBTAINING IMPROVED ULTRASONIC BOND STRENGTH

FIELD OF THE INVENTION

This invention is directed to a method for ultrasonically bonding or joining thermoplastic materials. More specifically, this invention is directed to preheating substantially melt-compatible thermoplastic materials prior to ultrasonic bonding to provide an ultrasonic bond having an increased bond strength.

Disposable garments, such as adult incontinence wear as well as infant and children's diapers, swim wear and training pants, typically include materials which are joined together and connected using an ultrasonic process. For example, a training pant may have a front side panel and a back side panel which are joined together at a side seam to provide a complete side panel. The side panels are typically connected at the side seam using an ultrasonic process. However, the ability to form strong ultrasonic bonds using conventional processes is limited by several factors, including the process converting speeds or production line speeds, bonding time or dwell time, and the thickness and/or basis weight of the materials being bonded. For example, for particular materials, such as spunbond laminate materials, as the production line speed increases, the dwell time decreases and a strong ultrasonic bond may not form properly. Insufficient bond strength can severely limit potential product converting speeds. Further, for these particular materials, the hot melt adhesives used to bond the spunbond materials and the elastic filaments or fibers may inhibit the effectiveness of conventional ultrasonic bonding processes.

Several early attempts to improve the ultrasonic bonding process focused on the mechanics of the ultrasonic horn, such as, for example, increasing the energy available from the ultrasonic horn by increasing the horn vibrational amplitude or other design features. However, the mechanical design of the ultrasonic horn may limit the maximum energy that can be delivered by the ultrasonic system to the materials being bonded, thus making it difficult to further enhance the bonding capability of the ultrasonic bonder by modifying the ultrasonic horn and/or the amplifier design.

Thus, there is a need or desire for an ultrasonic bonding process that provides sufficiently strong bonds at increased production line speeds and corresponding decreased dwell times.

There is a need or desire for a controllable ultrasonic bonding process that provides ultrasonic bonds of varying predetermined strength.

There is a need or desire for an ultrasonic bonding process that provides sufficiently strong intermittent bonds, such as bonds to provide side seams which connect the front side panel and back side panel of personal care garments.

SUMMARY OF THE INVENTION

In response to the difficulties and problems discussed above, a method for ultrasonically bonding thermoplastic materials, such as, for example nonwoven webs and spunbond laminates, wherein the ultrasonic bonding method results in a substantial increase in the bond strength established between the materials, has been discovered. Preheating at least one of the materials prior to the ultrasonic bonding process results in an increase in the bond strength established between the materials.

Suitable materials include, but are not limited to, elastic spunbond laminates, for example vertical filament stretch-bonded laminates (VF SBL) and continuous filament stretch-bonded laminates (CF SBL). Additionally, films, woven and other nonwoven webs and/or solid blocks of ultrasonically bondable substrates may also be suitable materials. Additionally, many product applications are contemplated for this invention, wherein sufficient peel strength, shear strength, creep resistance, and/or multilayer construction is required.

In particular embodiments, preheating the materials prior to entering a main ultrasonic bonding apparatus results in a substantial increase in ultrasonic bond strength. The bond strength increases proportionately as the substrate feed temperature increases. There is a consistent trend between substrate temperature and ultrasonic bond strength over a range of about 70° F. to about 250° F. At higher initial or preheating temperatures, the strength of the subsequent ultrasonic bond may approach an ultimate tensile strength of the material. Alternatively, the materials may be cooled prior to entering the main ultrasonic bonding apparatus to a temperature of about 40° F. to about 70° F., thereby decreasing the strength of the subsequent ultrasonic bond.

Desirably, at least one substrate is preheated prior to entering the main ultrasonic bonding apparatus using a separate ultrasonic preheating unit. In one embodiment of this invention, the ultrasonic preheating unit includes an ultrasonic horn and an anvil having a smooth peripheral surface. As the materials are fed through a nip formed between the ultrasonic horn and the smooth anvil, the materials are preheated to an initial or preheating temperature and compressed, without substantially bonding or only partially bonding the materials. Other means known to those having ordinary skill in the art may be used for preheating the materials prior to entering the main ultrasonic bonding apparatus, such as hot air, heated blocks or heated rollers, infrared, laser, RF and microwave preheating means and equivalents thereof.

Decoupling the preheating process from the ultrasonic bonding process enables the bond strength to be greatly increased over the capability of the main ultrasonic bonding apparatus alone. It also allows the bond strength to be controllably "dialed in" between essentially no bond to a bonding level which may approach the ultimate tensile strength of the materials, irrespective of the bonding speed and bonding time.

With the foregoing in mind, it is a feature and advantage of the present invention to provide a method for ultrasonically bonding thermoplastic materials, for example melt-compatible thermoplastic materials, wherein at least one of the materials is preheated before the materials are ultrasonically bonded to substantially increase the ultimate bond strength established between the materials.

It is further a feature and advantage of the invention to provide a method for ultrasonically bonding thermoplastic materials, wherein the bond strength can be controlled irrespective of the bonding or production line speed and/or the bonding or dwell time.

It is a feature and advantage of the invention to provide an ultrasonic bonding method that provides sufficiently strong bonds.

BRIEF DESCRIPTION OF THE DRAWINGS

The present invention will be more fully understood and further advantages will become apparent when reference is made to the following detailed description of the invention and the accompanying drawings wherein like numerals represent like elements. The drawings are merely representative and are not intended to limit the scope of the appended claims.

DEFINITIONS

Figure 1:
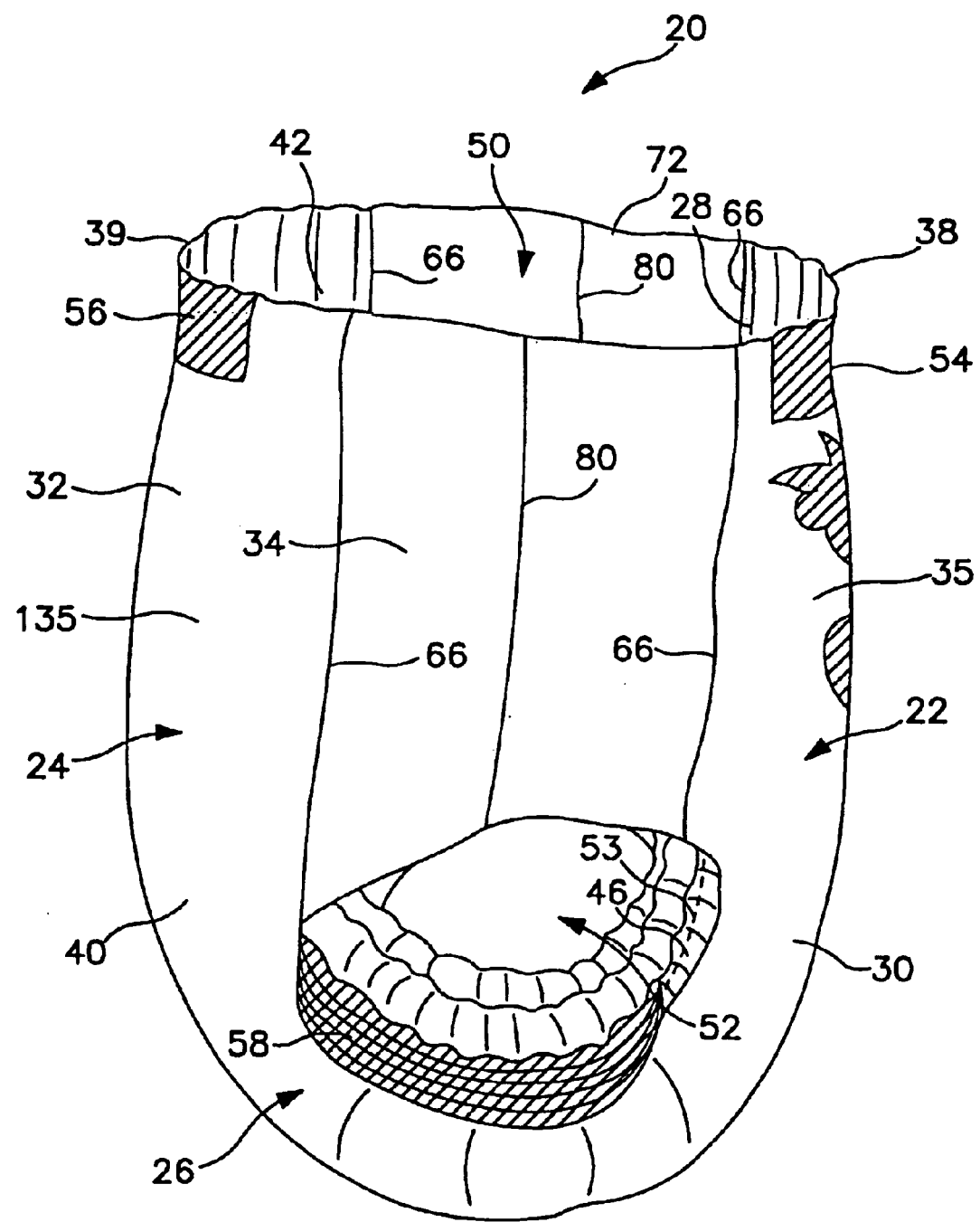
FIG. 1 is a side perspective view of an absorbent garment, according to one embodiment of this invention.

Within the context of this specification, each term or phrase below will include the following meaning or meanings.

"Bonded" refers to the joining, adhering, connecting, attaching, or the like, of two elements. Two elements will be considered to be bonded together when they are bonded directly to one another or indirectly to one another, such as when each is directly bonded to intermediate elements.

"Connected" refers to the joining, adhering, bonding, attaching, or the like, of two elements. Two elements will be considered to be connected together when they are connected directly to one another or indirectly to one another, such as when each is directly connected to intermediate elements.

"Continuous filament stretch-bonded laminate" or "CF SBL" refers to a stretch-bonded laminate made using a continuous horizontal filament process. Suitable CF SBL materials include laminates as described, for example, in U.S. Pat. No. 5,385,775 issued on Jan. 31, 1995 to Wright, which is incorporated herein by reference.

"Cross direction" refers to the width of a fabric in a direction generally perpendicular to the direction in which it is produced, as opposed to "machine direction" which refers to the length of a fabric in the direction in which it is produced.

"Disposable" refers to articles which are designed to be discarded after a limited use rather than being laundered or otherwise restored for reuse.

"Disposed," "disposed on," and variations thereof are intended to mean that one element can be integral with another element, or that one element can be a separate structure bonded to or placed with or placed near another element.

"Elastic," "elasticized" and "elasticity" mean that property of a material or composite by virtue of which it tends to recover its original size and shape after removal of a force causing a deformation.

"Elastomeric" refers to a material or composite which can be elongated by at least 25 percent of its relaxed length and which will recover, upon release of the applied force, at least 10 percent of its elongation. It is generally preferred that the elastomeric material or composite be capable of being elongated by at least 100 percent, more preferably by at least 300 percent, of its relaxed length and recover, upon release of an applied force, at least 50 percent of its elongation.

"Fabrics" is used to refer to all of the woven, knitted and nonwoven fibrous webs.

"Fiber" or "fibrous" is meant to refer to a particulate material wherein the length to diameter ratio of such particulate material is greater than about 10. Conversely, a "nonfiber" or "nonfibrous" material is meant to refer to a particulate material wherein the length to diameter ratio of such particulate material is about 10 or less.

"Film" refers to a thermoplastic film made using a film extrusion and/or foaming process, such as a cast film or blown film extrusion process. The term includes apertured films, slit films, and other porous films which constitute liquid transfer films, as well as films which do not transfer liquid.

"Flexible" refers to materials which are compliant and which will readily conform to the general shape and contours of the wearer's body.

"Garment" includes personal care garments, protective garments, and the like. The term "disposable garment" includes garments which are typically disposed of after 1–5 uses.

"Hydrophilic" describes fibers or the surfaces of fibers which are wetted by the aqueous liquids in contact with the fibers. The degree of wetting of the materials can, in turn, be described in terms of the contact angles and the surface tensions of the liquids and materials involved. Equipment and techniques suitable for measuring the wettability of particular fiber materials or blends of fiber materials can be provided by a Cahn SFA-222 Surface Force Analyzer System, or a substantially equivalent system. When measured with this system, fibers having contact angles less than 90° are designated "wettable" or hydrophilic, while fibers having contact angles greater than 90° are designated "nonwettable" or hydrophobic.

"Inelastic" refers to materials that are not elastic.

"Integral" or "integrally" is used to refer to various portions of a single unitary element rather than separate structures bonded to or placed with or placed near one another.

"Layer" when used in the singular can have the dual meaning of a single element or a plurality of elements.

"Liquid-impermeable," when used to describe a layer or laminate means that liquid such as urine will not pass through the layer or laminate under ordinary use conditions in a direction generally perpendicular to the plane of the layer or laminate at the point of liquid contact.

"Liquid-permeable," refers to a layer or laminate that is not liquid impermeable.

Figure 3:
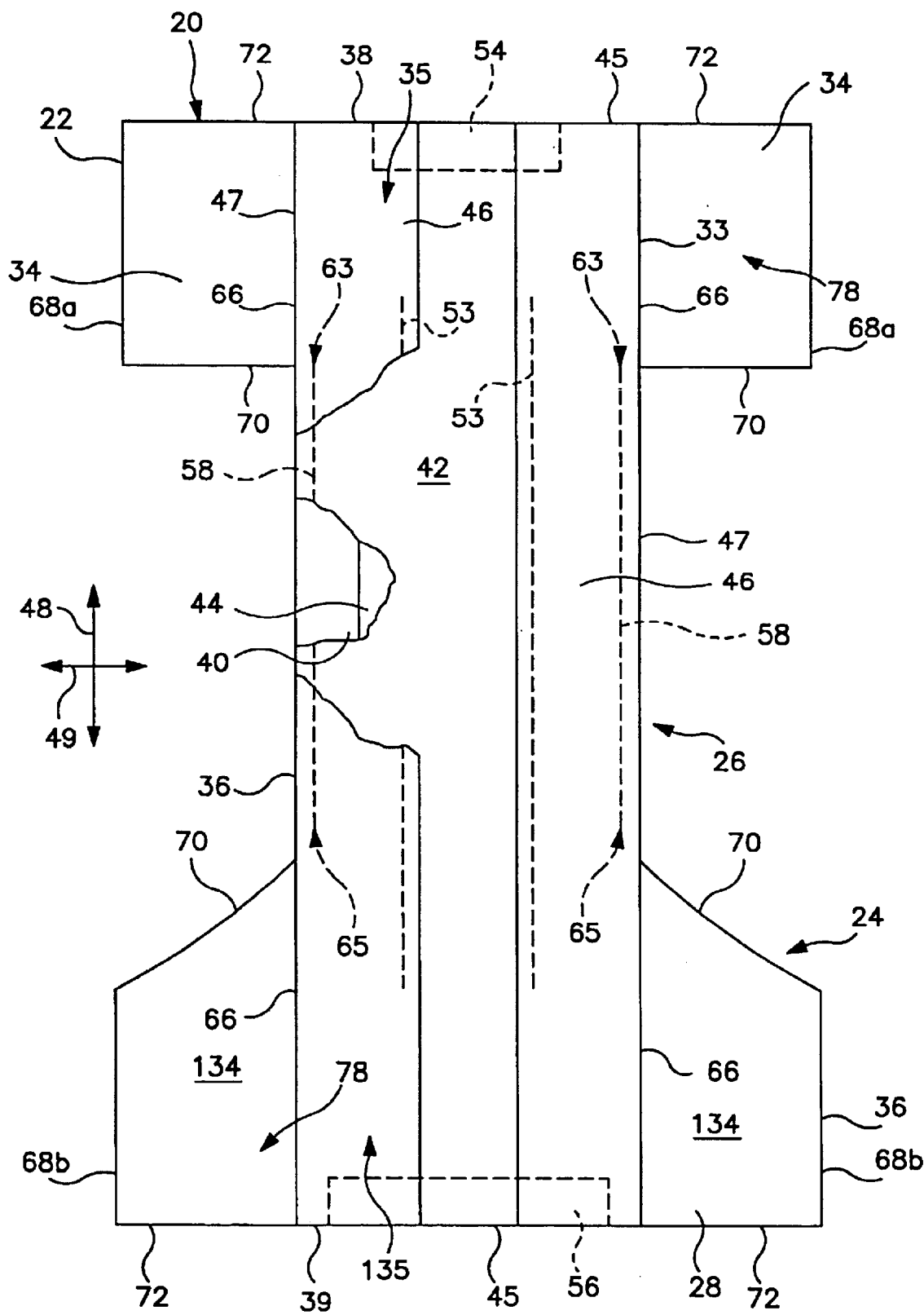
FIG. 3 is a plan view of the absorbent garment of FIGS. 1 and 2 in a partially disassembled, stretched flat state, and showing the surface of the garment that faces the wearer when the article is worn, and with portions cut away to show the underlying features, according to one embodiment of this invention.

"Longitudinal" and "transverse" have their customary meaning, as indicated by the longitudinal and transverse axes depicted in FIG. 3. The longitudinal axis lies in the plane of the article and is generally parallel to a vertical plane that bisects a standing wearer into left and right body halves when the article is worn. The transverse axis lies in the plane of the article generally perpendicular to the longitudinal axis. The article as illustrated is longer in the longitudinal direction than in the transverse direction.

"Machine direction" refers to the length of a fabric in the direction in which it is produced, as opposed to "cross direction" which refers to the width of a fabric in a direction generally perpendicular to the machine direction.

"Meltblown fibers" means fibers formed by extruding a molten thermoplastic material through a plurality of fine, usually circular, die capillaries as molten threads or filaments into converging high velocity heated gas (e.g., air)

streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed for example, in U.S. Pat. No. 3,849,241 to Butin et al. Meltblown fibers are microfibers which may be continuous or discontinuous, are generally smaller than 10 microns in diameter, and are generally self bonding when deposited onto a collecting surface. Meltblown fibers used in the invention are suitably substantially continuous.

"Member" when used in the singular can have the dual meaning of a single element or a plurality of elements.

"Microfibers" means small diameter fibers having an average diameter not greater than about 75 microns, for example, having an average diameter of from about 1 micron to about 50 microns, or more particularly, having an average diameter of from about 1 micron to about 30 microns.

"Nonwoven fabric or web" means a web having a structure of individual fibers or filaments which are interlaid, but not manipulated in a manner such as in a knitted fabric. The terms "fiber" and "filament" are used herein interchangeably. Nonwoven fabrics or webs have been formed from many processes such as, for example, meltblowing processes, spunbonding processes, air laying processes, and bonded carded web processes. The term also includes films that have been cut into narrow strips, perforated or otherwise treated to allow air to pass through. The basis weight of nonwoven fabrics is usually expressed in ounces of material per square yard (osy) or grams per square meter (gsm) and the fiber diameters are usually expressed in microns. (Note that to convert from osy to gsm, multiply osy by 33.91.)

"Operatively joined," in reference to the attachment of an elastic member to another element, means that the elastic member when attached to or connected to the element, or treated with heat or chemicals, by stretching, or the like, gives the element elastic properties; and with reference to the attachment of a non-elastic member to another element, means that the member and element can be attached in any suitable manner that permits or allows them to perform the intended or described function of the joinder. The joining, attaching, connecting or the like can be either directly, such as joining either member directly to an element, or can be indirectly by means of another member disposed between the first member and the first element.

"Permanently bonded" refers to the joining, adhering, connecting, attaching, or the like, of two elements of an absorbent garment such that the elements tend to be and remain bonded during normal use conditions of the absorbent garment.

"Personal care garment" includes diapers, training pants, swim wear, absorbent underpants, adult incontinence products, feminine hygiene products, and the like.

"Polymers" include, but are not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and atactic symmetries.

"Recover" or "retract" relates to a contraction of a stretched material upon termination of a biasing force following stretching of the material by application of the biasing force.

"Side seam" refers to a region on a pant-like disposable garment where a front side panel is connected to a back side panel to form a pant-like garment.

"Shearing strain" refers to forces that tend to produce an opposite but parallel sliding motion between two bodies' planes.

"Spunbond fibers" refers to small diameter fibers which are formed by extruding molten thermoplastic material as filaments from a plurality of fine capillaries of a spinnerette having a circular or other configuration, with the diameter of the extruded filaments then being rapidly reduced as by, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartman, U.S. Pat. No. 3,502,538 to Petersen, and U.S. Pat. No. 3,542,615 to Dobo et al. Spunbond fibers are quenched and generally not tacky on the surface when they enter the draw unit, or when they are deposited onto a collecting surface. Spunbond fibers are generally continuous and may have average diameters larger than 7 microns, often between about 10 and 30 microns.

"Staple filaments or fibers" means filaments or fibers which are natural or which are cut from a manufactured filament prior to forming into a web, and which have a length ranging from about 0.1–15 cm, more commonly about 0.2–7 cm.

"Stretchable" means that a material can be stretched, without breaking, to at least 150% of its initial (unstretched) length in at least one direction, suitably to at least 200% of its initial length, desirably to at least 250% of its initial length.

"Substantially continuous filaments or fibers" refers to filaments or fibers prepared by extrusion from a spinnerette, including without limitation spunbonded and meltblown fibers, which are not cut from their original length prior to being formed into a nonwoven web or fabric. Substantially continuous filaments or fibers may have lengths ranging from greater than about 15 cm to more than one meter; and up to the length of the nonwoven web or fabric being formed. The definition of "substantially continuous filaments or fibers" includes those which are not cut prior to being formed into a nonwoven web or fabric, but which are later cut when the nonwoven web or fabric is cut.

"Substantially melt-compatible" refers to materials, for example thermoplastic polymer materials, which when heated using conventional heating means, such as ultrasonic heating, are miscible. Such compatible polymer materials form a strong boundary layer when melted and bond well to each other. Conversely, polymer materials which are incompatible are immiscible when melted using conventional heating means and form a weak boundary layer. Thus, incompatible polymer materials do not bond well to each other.

"Superabsorbent" or "superabsorbent material" refers to a water-swellable, water-insoluble organic or inorganic material capable, under the most favorable conditions, of absorbing at least about 15 times its weight and, more desirably, at least about 30 times its weight in an aqueous solution containing 0.9 weight percent sodium chloride. The superabsorbent materials can be natural, synthetic and modified natural polymers and materials. In addition, the superabsorbent materials can be inorganic materials, such as silica gels, or organic compounds such as cross-linked polymers.

"Surface" includes any layer, film, woven, nonwoven, laminate, composite, or the like, whether pervious or impervious to air, gas, and/or liquids.

"Thermoplastic" describes a material that softens when exposed to heat and which substantially returns to a non-softened condition when cooled to room temperature.

"Vertical filament stretch-bonded laminate" or "VF SBL" refers to a laminate made using a continuous vertical filament process. Suitable VF SBL materials include laminates as described, for example, in PCT International Application WO 01/88245, published on Nov. 22, 2001 in the name of Welch et al., which is incorporated herein by reference.

These terms may be defined with additional language in the remaining portions of the specification.

DETAILED DESCRIPTION OF THE INVENTION

The present invention is directed to a method for ultrasonically bonding thermoplastic materials, for example nonwoven webs and elastic laminate materials, wherein one or more materials are preheated prior to ultrasonic bonding, and a disposable garment having such ultrasonic bonds, formed for example as a side seam connecting a front side panel to a rear side panel. In certain embodiments of this invention, suitable thermoplastic materials include melt-compatible thermoplastic materials comprising at least one of a woven material, nonwoven material, film, laminate and combinations thereof. The method of the present invention may be applied to ultrasonically bond any suitable materials together, for example a nonwoven web to a nonwoven web, a nonwoven web to a film, a film to a film and a nonwoven web or film to stranded materials.

The principles of the present invention can be incorporated into any suitable article of manufacture, such as a garment having bondable layers. Examples of such suitable garments include absorbent garments such as diapers, training pants, feminine hygiene products, incontinence products, as well as other personal care garments, disposable clothing, health care garments, or the like. Further, the methods of the present invention may be used for forming any suitable bond or seam to connecting suitable materials. For ease of explanation, the description hereafter will be in terms of a side seam of a child's training pant formed by an ultrasonic bonding method in accordance with this invention.

Referring to FIG. 1, a disposable absorbent article, such as a training pant 20, is illustrated in a fastened condition. The training pant 20 includes an absorbent chassis 32. The absorbent chassis 32 defines a front region 22, a back region 24, a crotch region 26 interconnecting the front region 22 and the back region 24, an inner surface 28 which is configured to contact the wearer, and an outer surface 30 opposite the inner surface 28 which is configured to contact the wearer's clothing. With additional reference to FIGS. 2 and 3, the absorbent chassis 32 also defines a pair of transversely opposed side edges 36 and a pair of longitudinally opposed waist edges, which are designated front waist edge 38 and back waist edge 39. The front region 22 is contiguous with the front waist edge 38, and the back region 24 is contiguous with the back waist edge 39.

Figure 2:
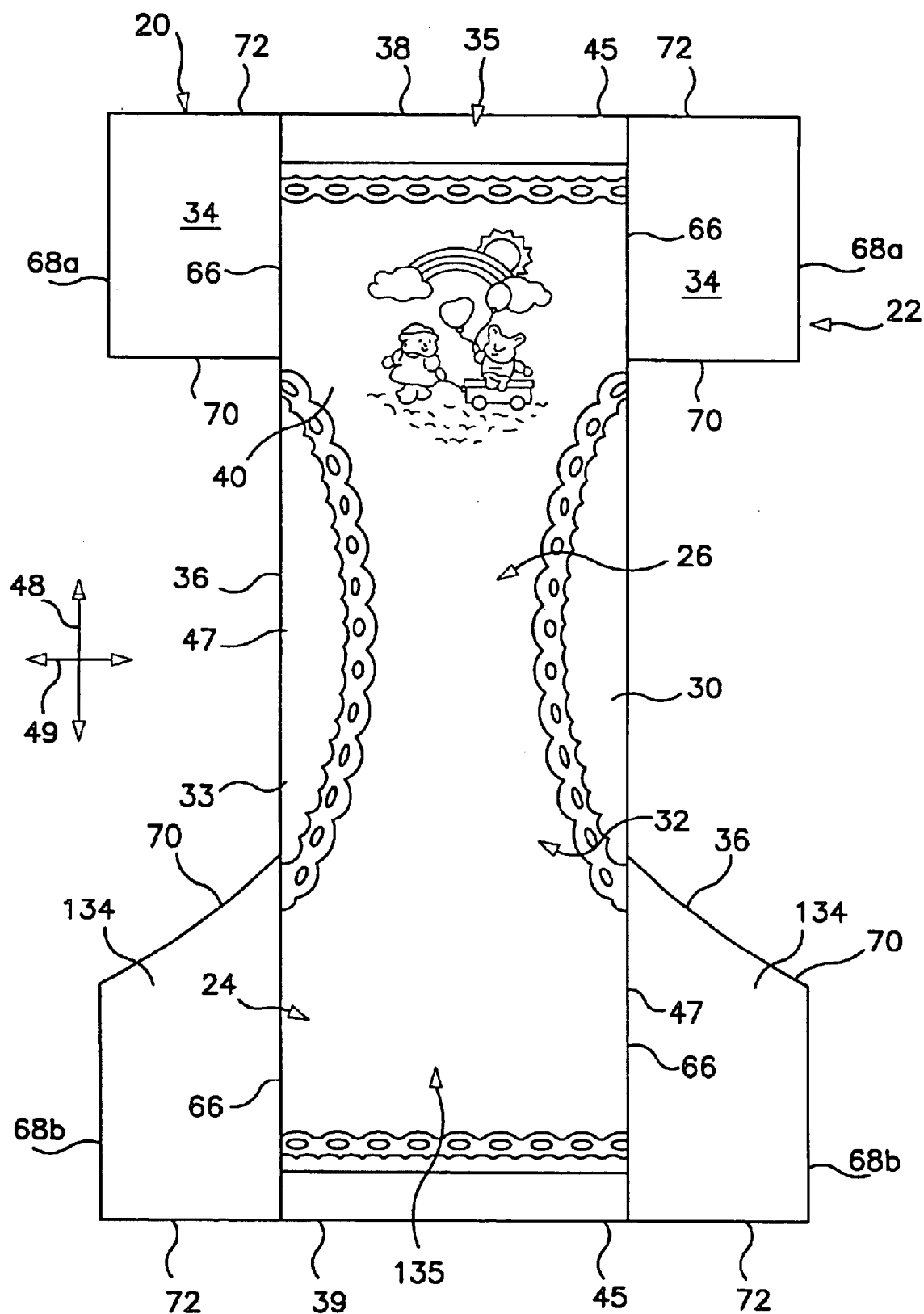
FIG. 2 is a plan view of the absorbent garment of FIG. 1 in a partially disassembled, stretched flat state, and showing the surface of the garment that faces away from the wearer when the garment is worn, according to one embodiment of this invention.

The illustrated absorbent chassis 32 can include a somewhat rectangular composite structure 33, a pair of transversely opposed front side panels 34, and a pair of transversely opposed back side panels 134. The composite structure 33 and side panels 34 and 134 may be integrally formed (not shown) or may include two or more separate elements, as shown in FIGS. 2 and 3. The illustrated composite structure 33 includes an outer cover 40, a bodyside liner 42 which is connected to the outer cover in a superposed relation, an absorbent core 44 (FIG. 3) which is located between the A outer cover 40 and the bodyside liner 42, and a pair of containment flaps 46 (FIG. 3). The rectangular composite structure 33 has opposite linear end edges 45 that form portions of the front and back waist edges 38 and 39, and opposite linear or curvilinear side edges 47 that form portions of the side edges 36 of the absorbent chassis 32 (FIGS. 2 and 3). For reference, arrows 48 and 49 depicting the orientation of the longitudinal axis and the transverse axis, respectively, of the training pant 20 are illustrated in FIGS. 2 and 3.

With the training pant 20 in the fastened position as illustrated in FIG. 1, the front region 22 and the back region 24 are joined together to define a three-dimensional pant configuration having a waist opening 50 and a pair of leg openings 52. The front region 22 includes the portion of the training pant 20 which, when worn, is positioned on the front of the wearer while the back region 24 includes the portion of the training pant which, when worn, is positioned on the back of the wearer. The crotch region 26 of the training pant 20 includes the portion of the training pant which, when worn, is positioned between the legs of the wearer and covers the lower torso of the wearer. The front side panels 34 and the back side panels 134 include the portions of the training pant 20 which, when worn, are positioned on the hips of the wearer.

The front region 22 of the absorbent chassis 32 includes the transversely opposed front side panels 34 and a front center panel 35 (FIGS. 1–3) positioned between and interconnecting the side panels, along with a front waist elastic member 54 and any other connected components. The back region 24 of the absorbent chassis 32 includes the transversely opposed back side panels 134 and a back center panel 135 (FIGS. 2 and 3) positioned between and interconnecting the side panels, as well as a rear waist elastic member 56 and any other connected components. The waist edges 38 and 39 of the absorbent chassis 32 are configured to encircle the waist of the wearer when worn and provide the waist opening 50 which defines a waist perimeter dimension. Portions of the transversely opposed side edges 36 in the crotch region 26 generally define the leg openings 52.

The absorbent chassis 32 is configured to contain and/or absorb any body exudates discharged from the wearer. For example, the absorbent chassis 32 desirably, although not necessarily, includes the pair of containment flaps 46 which are configured to provide a barrier to the transverse flow of body exudates. A flap elastic member 53 (FIGS. 1 and 3) is operatively joined with each containment flap 46 in any suitable manner as is well known in the art. The elasticized containment flaps 46 define an unattached edge which assumes an upright, generally perpendicular configuration in at least the crotch region 26 of the training pant 20 to form a seal against the wearer's body. The containment flaps 46 can be located along the transversely opposed side edges of the absorbent chassis 32, and can extend longitudinally along the entire length of the absorbent chassis 32 or may only extend partially along the length of the absorbent chassis 32. Suitable constructions and arrangements for the containment flaps 46 are generally well known to those skilled in the art and are described in U.S. Pat. No. 4,704,116 issued Nov. 3, 1987 to Enloe, which is incorporated herein by reference.

To further enhance containment and/or absorption of body exudates, the training pant 20 desirably includes the front waist elastic member 54, the rear waist elastic member 56, and leg elastic members 58, as are known to those skilled in the art (FIGS. 1 and 3). The waist elastic members 54 and 56 can be operatively joined to the outer cover 40 and/or bodyside liner 42 along the opposite waist edges 38 and 39, and can extend over part or all of the waist edges. The leg elastic members 58 are desirably operatively joined to the outer cover 40 and/or bodyside liner 42 along the opposite side edges 36 and positioned in the crotch region 26 of the training pant 20. The leg elastic members 58 are desirably longitudinally aligned along each side edge 47 of the composite structure 33. Each leg elastic member 58 has a front terminal point 63 and a back terminal point 65, which points represent the longitudinal ends of the elastic gathering caused by the leg elastic members. The front terminal points 63 are desirably located adjacent the longitudinally innermost parts of the front side panels 34, and the back terminal points 65 are desirably located adjacent the longitudinally innermost parts of the back side panels 134.

The flap elastic members 53, the waist elastic members 54 and 56, and the leg elastic members 58 can be formed of any suitable elastic material. As is well known to those skilled in the art, suitable elastic materials include sheets, strands or ribbons of natural rubber, synthetic rubber, or thermoplastic elastomeric polymers. The elastic materials can be stretched and adhered to a substrate, adhered to a gathered substrate, or adhered to a substrate and then elasticized or shrunk, for example with the application of heat; such that elastic constrictive forces are imparted to the substrate. In one particular embodiment, for example, the leg elastic members 58 include a plurality of dry-spun coalesced multifilament spandex elastomeric threads sold under the trade name LYCRA® and available from E. I. DuPont de Nemours and Company, Wilmington, Del., U.S.A.

The outer cover 40 desirably includes a material that is substantially liquid impermeable, and can be elastic, stretchable or nonstretchable. The outer cover 40 can be a single layer of liquid impermeable material, but desirably includes a multi-layered laminate structure in which at least one of the layers is liquid impermeable. For instance, the outer cover 40 can include a liquid permeable outer layer and a liquid impermeable inner layer that are suitably joined together by a laminate adhesive (not shown). Suitable laminate adhesives, which can be applied continuously or intermittently as beads, a spray, parallel swirls, or the like, can be obtained from Findley Adhesives, Inc., of Wauwatosa, Wis., U.S.A., or from National Starch and Chemical Company, Bridgewater, N.J., U.S.A. The liquid permeable outer layer can be any suitable material and desirably one that provides a generally cloth-like texture. One example of such a material is a 20 gsm (grams per square meter) spunbond polypropylene nonwoven web. The outer layer may also be made of those materials of which liquid permeable bodyside liner 42 is made. While it is not a necessity for the outer layer to be liquid permeable, it is desired that it provides a relatively cloth-like texture to the wearer.

The inner layer of the outer cover 40 can be both liquid and vapor impermeable, or can be liquid impermeable and vapor permeable. The inner layer is desirably manufactured from a thin plastic film, although other flexible liquid impermeable materials may also be used. The inner layer, or the liquid impermeable outer cover 40 when a single layer, prevents waste material from wetting articles, such as bedsheets and clothing, as well as the wearer and care giver. A suitable liquid impermeable film for use as a liquid impermeable inner layer, or a single layer liquid impermeable outer cover 40, is a 0.2 millimeter polyethylene film commercially available from Huntsman Packaging of Newport News, Va., U.S.A. If the outer cover 40 is a single layer of material, it can be embossed and/or matte finished to provide a more cloth-like appearance. As earlier mentioned, the liquid impermeable material can permit vapors to escape from the interior of the disposable absorbent article, while still preventing liquids from passing through the outer cover 40. A suitable "breathable" material is composed of a microporous polymer film or a nonwoven fabric that has been coated or otherwise treated to impart a desired level of liquid impermeability. A suitable microporous film is a PMP-1 film material commercially available from Mitsui Toatsu Chemicals, Inc., Tokyo, Japan, or an XKO-8044 polyolefin film commercially available from 3M Company, Minneapolis, Minn.

The liquid permeable bodyside liner 42 is illustrated as overlying the outer cover 40 and absorbent core 44, and may but need not have the same dimensions as the outer cover 40. The bodyside liner 42 is desirably compliant, soft feeling, and non-irritating to the child's skin. Further, the bodyside liner 42 can be less hydrophilic than the absorbent core 44, to present a relatively dry surface to the wearer and permit liquid to readily penetrate through its thickness.

The bodyside liner 42 can be manufactured from a wide selection of web materials, such as synthetic fibers (for example, polyester or polypropylene fibers), natural fibers (for example, wood or cotton fibers), a combination of natural and synthetic fibers, porous foams, reticulated foams, apertured plastic films, or the like. Various woven and nonwoven fabrics can be used for the bodyside liner 42. For example, the bodyside liner can be composed of a meltblown or spunbond web of polyolefin fibers. The bodyside liner can also be a bonded-carded web composed of natural and/or synthetic fibers. The bodyside liner can be composed of a substantially hydrophobic material, and the hydrophobic material can, optionally, be treated with a surfactant or otherwise processed to impart a desired level of wettability and hydrophilicity. For example, the material can be surface treated with about 0.45 weight percent of a surfactant mixture including AHCOVEL® N-62 from Uniqema Inc., a division of ICI of New Castle, Del., U.S.A. and GLUCOPON® 220UP from Cognis Corporation of Ambler, Pa., and produced in Cincinnati, Ohio, in an active ratio of 3:1. The surfactant can be applied by any conventional means, such as spraying, printing, brush coating or the like. The surfactant can be applied to the entire bodyside liner 42 or can be selectively applied to particular sections of the bodyside liner, such as the medial section along the longitudinal centerline.

A suitable liquid permeable bodyside liner 42 is a nonwoven bicomponent web having a basis weight of about 27 gsm. The nonwoven bicomponent can be a spunbond bicomponent web, or a bonded carded bicomponent web. Suitable bicomponent staple fibers include a polyethylene/polypropylene bicomponent fiber available from CHISSO Corporation, Osaka, Japan. In this particular bicomponent fiber, the polypropylene forms the core and the polyethylene forms the sheath of the fiber. Other fiber orientations are possible, such as multi-lobe, side-by-side, end-to-end, or the like. While the outer cover 40 and bodyside liner 42 can include elastomeric materials, it can be desirable in some embodiments for the composite structure to be generally inelastic, where the outer cover, the bodyside liner and the absorbent core include materials that are generally not elastomeric.

The absorbent core 44 (FIG. 3) is positioned between the outer cover 40 and the bodyside liner 42, which components can be joined together by any suitable means, such as adhesives, as is well known in the art. The absorbent core 44 can be any structure which is generally compressible, conformable, non-irritating to the child's skin, and capable of absorbing and retaining liquids and certain body wastes. The absorbent core 44 can be manufactured in a wide variety of sizes and shapes, and from a wide variety of liquid absorbent materials commonly used in the art. For example, the absorbent core 44 can suitably include a matrix of hydrophilic fibers, such as a web of cellulosic fluff, mixed with particles of a high-absorbency material commonly known as superabsorbent material. In a particular embodiment, the absorbent core 44 includes a matrix of cellulosic fluff, such as wood pulp fluff, and superabsorbent hydrogel-forming particles. The wood pulp fluff can be exchanged with synthetic, polymeric, meltblown fibers or with a combination of meltblown fibers and natural fibers. The superabsorbent particles can be substantially homogeneously mixed with the hydrophilic fibers or can be non-uniformly mixed. The fluff and superabsorbent particles can also be selectively placed into desired zones of the absorbent core 44 to better contain and absorb body exudates. The concentration of the superabsorbent particles can also vary through the thickness of the absorbent core 44. Alternatively, the absorbent core 44 can include a laminate of fibrous webs and superabsorbent material or other suitable means of maintaining a superabsorbent material in a localized area.

Suitable superabsorbent materials can be selected from natural, synthetic, and modified natural polymers and materials. The superabsorbent materials can be inorganic materials, such as silica gels, or organic compounds, such as crosslinked polymers. Suitable superabsorbent materials are available from various commercial vendors, such as Dow Chemical Company located in Midland, Mich., U.S.A., and Stockhausen GmbH & Co. KG, D-47805 Krefeld, Federal Republic of Germany. Typically, a superabsorbent material is capable of absorbing at least about 15 times its weight in water, and desirably is capable of absorbing more than about 25 times its weight in water.

In one embodiment, the absorbent core 44 is generally rectangular in shape, and includes a blend of wood pulp fluff and superabsorbent material. One preferred type of fluff is identified with the trade designation CR1654, available from U.S. Alliance, Childersburg, Ala., U.S.A., and is a bleached, highly absorbent sulfate wood pulp containing primarily soft wood fibers. As a general rule, the superabsorbent material is present in the absorbent core 44 in an amount of from about 0 to about 90 weight percent based on total weight of the absorbent core. The absorbent core 44 suitably has a density within the range of about 0.10 to about 0.50 grams per cubic centimeter. The absorbent core 44 may or may not be wrapped or encompassed by a suitable tissue wrap that maintains the integrity and/or shape of the absorbent core.

The absorbent chassis 32 can also incorporate other materials that are designed primarily to receive, temporarily store, and/or transport liquid along the mutually facing surface with the absorbent core 44, thereby maximizing the absorbent capacity of the absorbent core. One suitable material is referred to as a surge layer (not shown) and includes a material having a basis weight of about 50 to about 120 grams per square meter, and including a through-air-bonded-carded web of a homogenous blend of 60 percent 3 denier type T-256 bicomponent fiber including a polyester core/polyethylene sheath and 40 percent 6 denier type T-295 polyester fiber, both commercially available from Kosa Corporation of Salisbury, N.C., U.S.A.

As noted previously, the illustrated training pant 20 has front and back side panels 34 and 134 disposed on each side of the absorbent chassis 32. These transversely opposed front side panels 34 and transversely opposed back side panels 134 can be permanently bonded to the composite structure 33 of the absorbent chassis 32 in the respective front and back regions 22 and 24, and are attached or connected to one another at a side seam 80. More particularly, as shown best in FIGS. 2 and 3, the front side panels 34 can be permanently bonded to and extend transversely beyond the side edges 47 of the composite structure 33 in the front region 22 along attachment lines 66, and the back side panels 134 can be permanently bonded to and extend transversely beyond the side edges of the composite structure in the back region 24 along attachment lines 66. The side panels 34 and 134 may be attached to the composite structure 33 and to each other using attachment means known to those skilled in the art such as adhesive bonding, thermal bonding or ultrasonic bonding. The side panels 34 and 134 can also be formed as a portion of a component of the composite structure 33, such as the outer cover 40 or the bodyside liner 42.

In particular embodiments for improved fit and appearance, the side panels 34 and 134 desirably have an average length dimension measured parallel to the longitudinal axis 48 that is about 20 percent or greater, and particularly about 25 percent or greater, of the overall length dimension of the absorbent article, also measured parallel to the longitudinal axis 48. For example, in training pants having an overall length dimension of about 54 centimeters, the side panels 34 and 134 desirably have an average length dimension of about 10 centimeters or greater, such as about 15 centimeters. While each of the side panels 34 and 134 extend from the waist opening 50 to one of the leg openings 52, the back side panels 134 have a continually decreasing length dimension moving from the attachment line 66 to a distal edge 68b of the back panel 134, as is best shown in FIGS. 2 and 3.

Each of the side panels 34 and 134 can include one or more individual, distinct pieces of material. In particular embodiments, for example, each side panel 34 and 134 can include first and second side panel portions that are joined at a seam, with at least one of the portions including an elastomeric material. Still alternatively, each individual side panel 34 and 134 can include a single piece of material which is folded over upon itself along an intermediate fold line (not shown).

The side panels 34 and 134 desirably include an elastic material capable of stretching in a direction generally parallel to the transverse axis 49 of the training pant 20. In particular embodiments, the front and back side panels 34 and 134 may each include an interior portion 78 disposed between the distal edge 68a, 68b and the respective front or back center panel 35 or 135. In the illustrated embodiment in FIG. 3, the interior portions 78 are disposed between the distal edges 68a, 68b and the side edges 47 of the rectangular composite structure 33. The elastic material of the side panels 34 and 134 can be disposed in the interior portions 78 to render the side panels elastomeric in a direction generally parallel to the transverse axis 49. Most desirably, each side panel 34 and 134 is elastomeric in a transverse direction from a waist end edge 72 to a leg end edge 70. More specifically, individual samples of side panel material, taken between the waist end edge 72 and the leg end edge 70 parallel to the transverse axis 49 and having a length from the attachment line 66 to the distal edge 68a, 68b and a width of about 2 centimeters, are all elastomeric.

Suitable elastic materials, as well as one described process of incorporating elastic side panels into a training pant, are described in the following U.S. Pat. No. : 4,940,464 issued Jul. 10, 1990 to Van Gompel et al.; U.S. Pat. No. 5,224,405 issued Jul. 6, 1993 to Pohjola; U.S. Pat. No. 5,104,116 issued Apr. 14, 1992 to Pohjola; and U.S. Pat. No. 5,046,272 issued Sep. 10, 1991 to Vogt et al.; all of which are incorporated herein by reference. In particular embodiments, the elastic material includes a stretch-thermal laminate (STL), a neck-bonded laminated (NBL), a reversibly necked laminate, or a stretch-bonded laminate (SBL) material. Methods of making such materials are well known to those skilled in the art and described in U.S. Pat. No. 4,663,220 issued May 5, 1987 to Wisneski et al.; U.S. Pat. No. 5,226,992 issued Jul. 13, 1993 to Morman; and European Patent Application No. EP 0 217 032 published on Apr. 8, 1987 in the names of Taylor et al.; all of which are incorporated herein by reference. Particularly suitable elastic materials include continuous filament stretch-bonded laminates (CF SBL), as described, for example, in U.S. Pat. No. 5,385,775 issued on Jan. 31, 1995 to Wright, and vertical filament stretch-bonded laminates (VF SBL), as described, for example, in PCT International Application WO 01/88245, published on Nov. 22, 2001 in the name of Welch et al., both of which have been incorporated herein by reference. Alternatively, the side panel material may include other woven or nonwoven materials, such as those described above as being suitable for the outer cover 40 or bodyside liner 42, or stretchable but inelastic materials.

As shown in FIG. 1, the training pant 20 according to the present invention includes a pair of laterally opposing side seams 80 for securing each front side panel 34 to the corresponding back side panel 134. The side seam 80 desirably extends from the waist opening 50 to one leg opening 52 between the front side panel 34 and the back side panel 134. In an alternative embodiment, the side seams 80 extend along a portion of the side panels 34 and 134 between the waist opening 50 and the leg openings 52.

Figure 4:
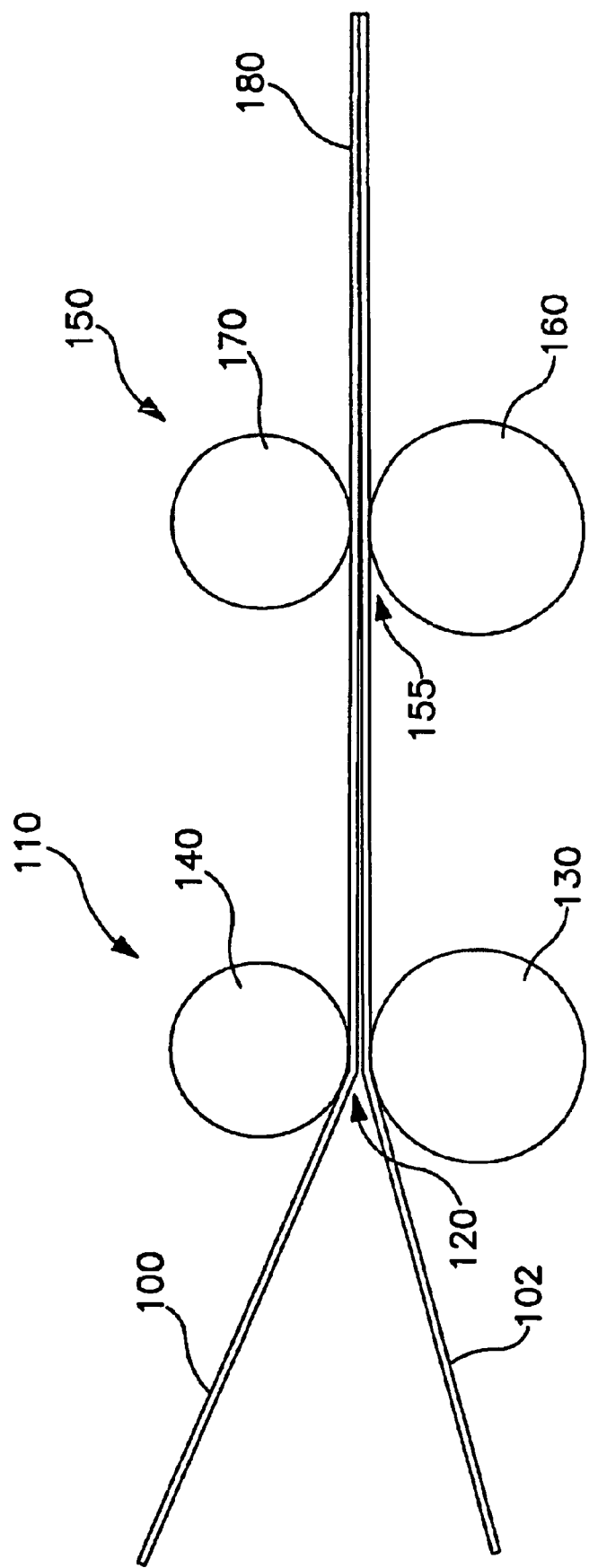
FIG. 4 schematically illustrates an ultrasonic bonding method, according to one embodiment of this invention.

Referring to FIG. 4, in accordance with one embodiment of this invention, preheated melt-compatible thermoplastic materials are ultrasonically bonded to connect various components of the training pant 20. For example, the side seam 80 can be formed by ultrasonically bonding the front side panel 34 and the back side panel 134, each comprising a suitable material as described above. In one embodiment of this invention, the front side panel 34 and the back side panel 134 each comprises an elastic spunbond laminate material, for example an elastomeric to material including elastomeric filaments disposed between spunbond facing layers, such as a VF SBL material or a CF SBL material. The front side panel 34 can comprise a suitable material different from the material of the back side panel 134.

The method in accordance with one embodiment of this invention begins with preheating one or more of the material substrates. The material substrates may be preheated using any suitable means known to those skilled in the art including, but not limited to, hot air, heated blocks or heated rollers, ultrasound, infrared, laser, RF, microwaves, and equivalents thereof. Desirably, the material substrates are preheated by passing the materials through a separate ultrasonic preheating unit, such as a plunge ultrasonic bonding apparatus or a rotary ultrasonic bonding apparatus.

In accordance with one embodiment of this invention, a first material or web 100 and a second material or web 102 each is passed through an ultrasonic preheating unit 110. The webs 100, 102 pass through a nip or space 120 formed between an ultrasonic horn 130 and the anvil 140. Desirably, but not necessarily, the anvil 140 has a smooth peripheral surface. As the webs 100, 102 pass through the nip 120, the webs 100, 102 are preheated and compressed together. In certain embodiments of this invention, only a portion of each web 100, 102, for example an edge portion of each web 100, 102, may be preheated and compressed together. Suitably, the webs 100, 102, or at least a portion of each web, is preheated to an initial or preheating temperature ($T_1$) of at least about 70° F., desirably to a temperature of about 130° F. to about 250° F., and more desirably about 160° F. to about 250° F. In accordance with certain embodiments of this invention, the webs 100, 102 may be heated to a preheating temperature greater than about 250° F., if desired, provided that the temperature does not cause deformation or overheating of the material substrates. As the preheated webs 100, 102 exit the ultrasonic preheating unit 110, the preheated webs desirably are not substantially ultrasonically bonded together, although they may be in particular embodiments.

In accordance with certain embodiments of this invention, the preheating step can be modified in order to provide bonds having a predetermined bond strength depending upon specific design requirements. For example, in accordance with one embodiment of this invention, a region or zone of low bond strength may be adjacent a region or zone of relatively higher bond strength, for example, for use as a fastening or closure means for a suitable garment.

In accordance with one embodiment of this invention, registered zones of high bond strength and low bond strength can be provided by the anvil 140 having a contoured peripheral surface, for example. The anvil 140 may have scalloped-shaped or concave-shaped depressions formed within the peripheral surface so that only a portion of the webs 100, 102 are preheated by contact with the anvil 140, as the webs 100, 102 pass through the ultrasonic preheating unit 110.

For example, a first thermoplastic material may have a first region and a second region. The first region can be preheated to a first temperature and the second region can be preheated to a second temperature different than the first tempature. The resulting ultrasonic bond has a first portion which corresponds to the first region and a second portion which corresponds to the second region. The strength of the first portion may be different than the strength of the second portion, for example the first portion may have a stronger bond strength than the second portion.

In certain embodiments wherein the webs 100, 102 are preheated by means other than the ultrasonic preheating unit 110, selected areas of the webs 100, 102 may be preheated or precooled. For example, a laser may be used to register high bond strength zones and low bond strength zones by exposing portions of the webs 100, 102 to the laser, desirably at predetermined intervals. Alternatively, the webs 100, 102 can be selectively cooled by supplying or exposing portions of the webs 100, 102 to $CO_2$, for example.

The ultrasonic preheating unit 110 is located upstream from a main or primary ultrasonic bonding means 150 by any suitable distance. For example, as discussed in the Examples below, the ultrasonic preheating unit 110 may be located about 24 inches upstream from the main ultrasonic bonding means 150. It is apparent to those skilled in the art that this distance may vary depending upon the method conditions and desired bond strength.

The preheated webs 100, 102 are passed through the main ultrasonic bonding means 150. The main ultrasonic bonding means 150 may be any suitable ultrasonic bonding apparatus, such as a plunge ultrasonic bonding apparatus or a rotary ultrasonic bonding apparatus. Suitable rotary ultrasonic bonding apparatus include such apparatus as disclosed in U.S. Pat. No. 5,096,532 and U.S. Pat. No. 5,110,403, the disclosures of which are incorporated herein by reference. For example, the main ultrasonic bonding means 150 may be a rotary ultrasonic bonding apparatus having a vibrating ultrasonic horn 160 and a patterned anvil 170 having a plurality of pins positioned on a peripheral surface of the patterned anvil 170 and forming a pin pattern. As the preheated webs 100, 102 are passed through a nip 155 formed between the vibrating ultrasonic horn 160 and the patterned anvil 170, the vibrating horn 160 compresses against the pins of the patterned anvil 170. The ultrasonic vibrations are mechanically converted to heat under pressure resulting in material flow and fusion over times as short as a few milliseconds.

Within the main ultrasonic bonding means 150, the webs 100, 102 are ultrasonically bonded together and a material 180, comprising the webs 100, 102 connected by at least one ultrasonic bond, exits the main ultrasonic bonding means 150. As a result of passing the webs 100, 102 through the ultrasonic preheating unit 110, ultrasonic bonds having a predetermined bond strength can be formed during the ultrasonic bonding process to connect the webs 100, 102.

Suitably, the webs 100, 102 are passed through the ultrasonic bonding means 150 at a production line speed of about 0 ft./min. to at least about 800 ft./min. having a bonding time or dwell time of about 1 millisecond (msec) to about 100 msec, depending upon the ultrasonic bonding apparatus utilized. The bonding time or the dwell time is defined as the amount of time that the webs 100, 102 are positioned between the vibrating ultrasonic horn 160 and the anvil 170. Of course, the line speed and bonding time may vary greatly depending on the particular process components and objectives.

For example, if a plunge ultrasonic bonding apparatus is utilized, the production line speed is about 0 ft./min. to about 300 ft./min. and the dwell time is about 50 msec to about 100 msec, desirably about 65 msec to about 85 msec. Alternatively, if a rotary ultrasonic bonding apparatus is utilized, suitably, the production line speed is at least about 300 ft./min., desirably at least about 475 ft./min. and in many cases at least about 800 ft./min. and, suitably, the dwell time is about 1 msec to about 20 msec, desirably about 1 msec to about 5 msec.

As discussed above, the webs 100, 102 suitably are preheated to a temperature of at least about 70° F., desirably at least about 130° F., and in many cases at least about 160° F. to about 250° F. In accordance with particular embodiments of the methods of this invention, the webs 100, 102 are heated to a preheating temperature during the preheating process and then maintained at the preheating temperature or heated to a second temperature ($T_2$) within the main ultrasonic bonding means 150 during the ultrasonic bonding process.

Alternatively, in accordance with one embodiment of this invention, the webs 100, 102 can be precooled before entering the main ultrasonic bonding means 150. Suitably, at least one of the webs 100, 102 is cooled to a temperature less than about 70° F., desirably to a temperature of about 40° F. to about 70° F. The webs 100, 102 can be precooled using any suitable cooling means known to those having ordinary skill in the art. The precooled webs 100, 102 are then fed into the main ultrasonic bonding means 150 and at least a portion of the precooled webs 100, 102 are ultrasonically bonded together. Precooling the webs 100, 102 before ultrasonic bonding results in an ultrasonic bond having a decreased bond strength. Thus, by either preheating or precooling at least one of the webs 100, 102 prior to ultrasonic bonding, an ultrasonic bond can be produced having a predetermined bond strength which may approach zero (precooling) or a bond strength which may approach the ultimate tensile strength of the materials (preheating).

Figure 6:
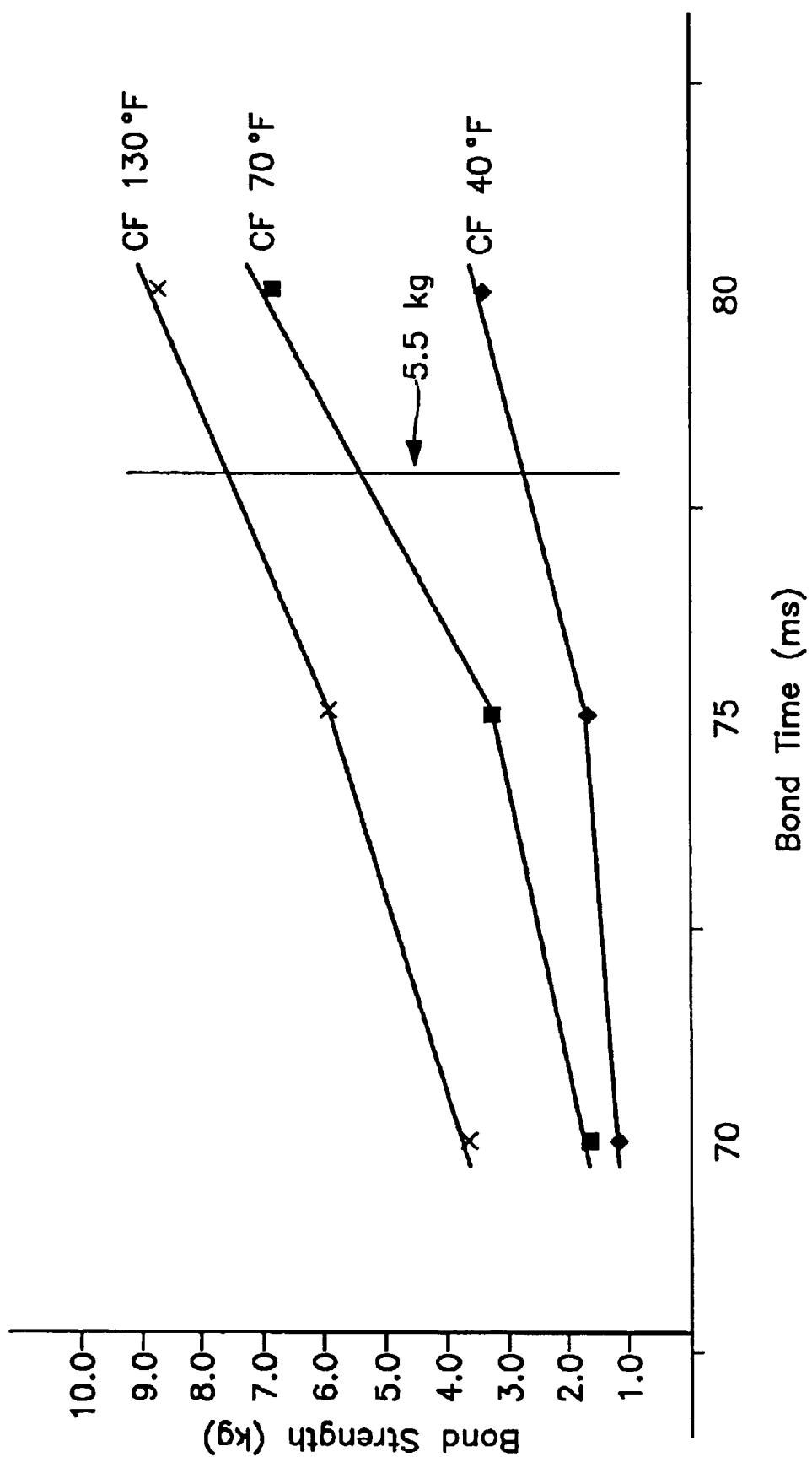

Thus, advantages associated with preheating (or precooling) the materials prior to entering the main ultrasonic bonding apparatus may include increased (or decreased) bond strength. As discussed in the Examples below, the increase in ultrasonic bond strength is directly proportional to the preheating temperature. Thus, a nearly linear trend between preheating temperature and the ultrasonic bond strength can be observed over a preheating temperature range between about 70° F. and about 250° F. At higher initial preheating temperatures, the ultrasonic bond strength may approach the ultimate tensile strength of the material. Further, the linear relation between the bond strength and the preheating temperature can be observed at increased production line speeds and higher bond times. FIG. 6, for example, clearly shows that bond strength increases as the preheating temperature increases, even as the production line speed increases and/or the dwell time or bond time decreases. Thus, benefits associated with the method of the present invention are not lost as line speeds increase and/or dwell times decrease.

Another advantage to the method in accordance with this invention is that the ultrasonic bonding capability is enhanced by a separate preheating mechanism or means prior to the ultrasonic bonding means. Decoupling the preheating process from the ultrasonic bonding process provides an ultimate bond strength greater than the capability of the main ultrasonic bonding apparatus, without changing or adjusting its configuration. Further, the bond strength is easily controllable between a bond strength which approaches zero and a bond strength which approaches the ultimate tensile strength of the materials, independent of the production line speed and/or the bonding time.

Test Procedure for Measuring Seam Bond Strength

This test is used to test a seam bond strength between two materials or components, such as two materials in a personal care garment comprising one or more seams. The test is conducted in a standard laboratory atmosphere of 23±2° C. (73.4±3.6° F.) and 50±5% relative humidity. The ultrasonically bonded seams are removed by cutting along the inside edge (the absorbent side) of the material attachment to obtain a 3 inch×3 inch specimen. The attachment between the materials and the glue line is marked. These markings are then used to align the specimen in the grips of the tensile tester, each grip having a width of about 3 inches. The specimen is clamped into the grips so that the marked glue lines are aligned with the bottom edge of the top grip and the top edge of the bottom grip. In pilot tests where panels or components may not be fully attached to an absorbent chassis, the bonded specimens are mounted perpendicular to the grip jaw's face. The bond or seam is centered between the grips with the bond facing outwardly from the tensile tester. The material is pulled apart in a T-peel fashion at a crosshead speed of 500±10 mm/min. The tensile tester runs until the specimen ruptures and the peak load bond strength (kg) result is obtained. A suitable tensile tester can be obtained from Instron Corporation located in Canton, Mass., U.S.A.

EXAMPLES

Example 1
VF SBL Materials Preheated with Hot Air (350° F.)

The VF SBL material comprises a plurality of elastic KRATON® 2760 polymer filaments having a basis weight of about 10 gsm, which may be obtained from the Shell Chemical Company, sandwiched between two facing layers each comprising Exxon 3854 type polypropylene spunbond webs having a basis weight of about 17 gsm. 3.0 gsm Bostik-Findley H2096 adhesive is applied to the facing layers to laminate the filaments to the facing layers. The final or total basis weight of one layer of elasticized VF SBL material is about 85 gsm in its retracted or gathered state.

The VF SBL specimens, which comprised two layers of the VF SBL material, were plunge bonded at ambient temperature at a bond time of about 75 msec and about 80 msec to establish a baseline control bond strength. The specimens each measured about 3 inches×3 inches and had a combined basis weight of about 170 gsm.

The specimens were ultrasonically bonded using a Branson 931 AES, Ultrasonic Stationary Plunge Bonder, available from Branson Ultrasonic Corporation located in Danbury, Conn., U.S.A., having the following specifications:

| Frequency | 20 kHz |
|---|---|
| Power | 3000 watt |
| Air Pressure | 75 psi |
| Hold time | 240 msec |
| Trigger Pressure | 10 lbs |
| Horn Length | 5.5" |
| Height | 5.38" |
| Width across bottom | 0.5" |
| Horn Peak to Peak Amplitude | 3.1 mil |

The specimens were preheated using a hot air gun. The hot air gun was initially calibrated to 350° F. by determining the distance from the hot air gun to a thermocouple that heated the thermocouple to 350° F. The hot air gun was then directed toward each 3 inch wide VF SBL specimen for approximately 10 seconds to preheat it. Each specimen was then immediately plunge bonded to demonstrate that a bond strength improvement could be achieved. These experiments were conducted to prove that preheating the laminate material prior to ultrasonic bonding increases the bond strength of the ultrasonic bond, and should be considered qualitative. The temperature control may not be accurate. Each specimen was tested for bond strength using the test procedure for measuring seam bond strength described above. TABLE displays the average results of the bond strength testing for the VF SBL material, measured in kilograms (kg).

TABLE 1

AVERAGE ULTRASONIC BOND STRENGTH (KG)

| Bond Time (msec) | Ambient Temp. (75° F.) | Preheated Temp. (350° F.) | Increase in Bond Strength (%) |
|---|---|---|---|
| 75 | 1.6 | 2.5 | 58 |
| 80 | 3.1 | 4.4 | 43 |

Figure 5:
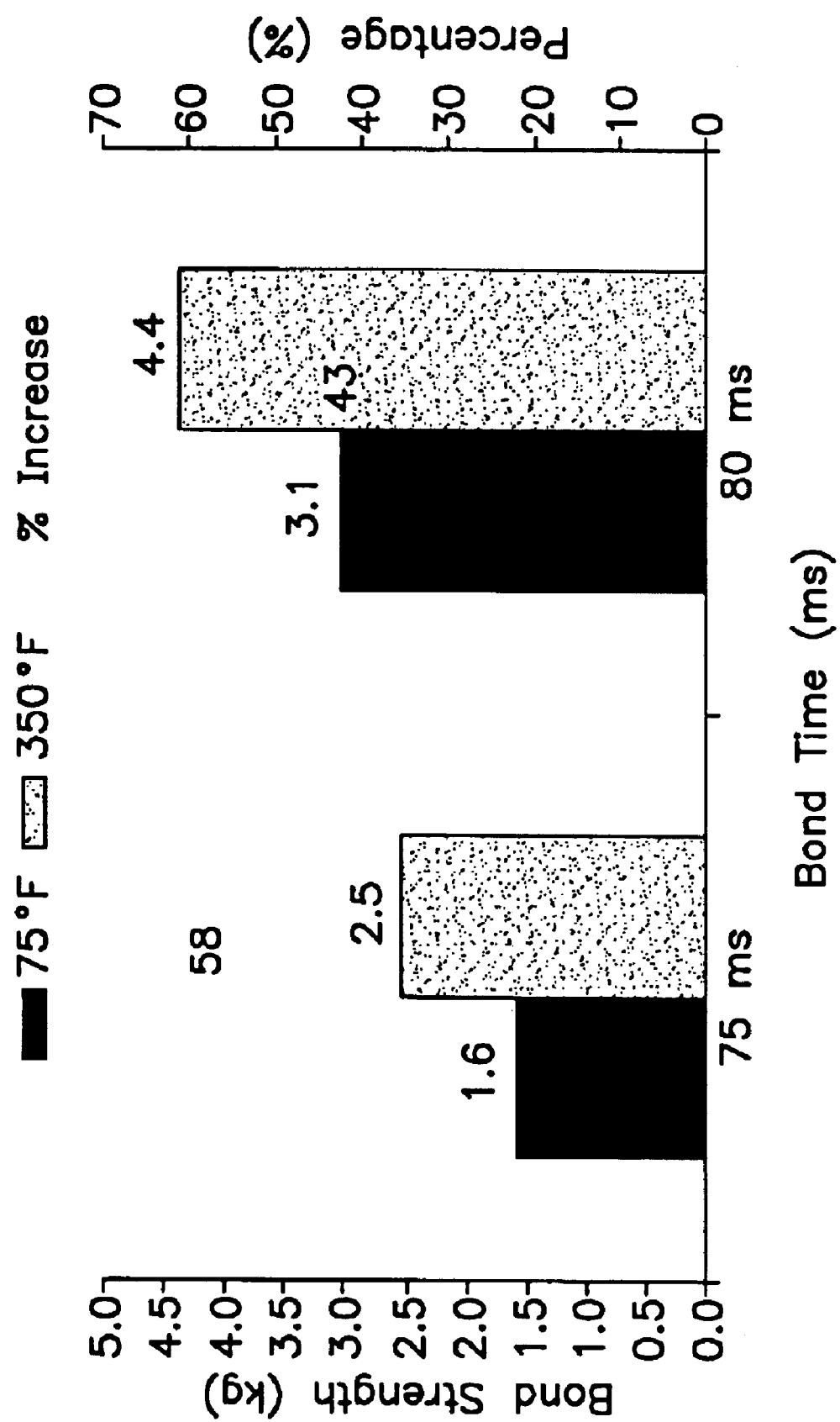
FIGS. 5–15 illustrate test results obtained as set forth in the Examples below, according to certain embodiments of this invention.

Although, as shown in FIG. 5, preheating the materials can increase the ultrasonic bond strength, the preheating process is slow due to poor heat transfer from the hot air to the VF SBL material.

Example 2
Effect of Preheating CF SBL Material on Ultrasonic Bond Strength

The CF SBL material comprises a meltblown web including KRATON® 2760 polymer filaments, having a basis weight of about 12 gsm, sandwiched between two polypropylene spunbond webs, each having a basis weight of about 13.6 gsm. The final or total basis weight of one layer of the CF SBL material is about 84.8 gsm in its retracted or gathered state.

The CF SBL specimens, which comprised two layers of the CF SBL material, were first preheated or precooled between two brass blocks, and then ultrasonically bonded using the Branson plunge bonder. The preheating (precooling) temperature was controlled in these specimens by equilibrating the elastic laminate preheating temperature between the brass blocks held at the desired temperature. The specimens were slipped from between the two brass blocks directly into position to be plunge bonded. The time delay was less than 1 second, so the preheating temperature should be accurate to within a few degrees. Each specimen was plunge bonded and the resulting ultrasonic bond was tested for bond strength using the test procedure for measuring seam bond strength described above. TABLE 2 displays the average results of the bond strength testing for the CF SBL material, measured in kg.

TABLE 2

AVERAGE ULTRASONIC BOND STRENGTH (KG)

| Bond Time (msec) | 40° F. | 70° F. | 100° F. | 130° F. |
|---|---|---|---|---|
| 70 | 1.2 | 1.7 | 3.4 | 3.7 |
| 75 | 1.7 | 3.3 | 6.1 | 5.9 |
| 80 | 3.4 | 6.8 | 7.6 | 8.7 |

As shown in TABLE 2 and FIG. 6, preheating the CF SBL specimens resulted in a bond strength which consistently improved with increasing temperature and bond time. Further, the bond strength was observed to decrease for specimens cooled from about 70° F. to about 40° F. As shown in FIG. 6, in certain embodiments of this invention, the bond strength desirably is at least about 5.5 kg, to provide adequate bond strength in training pants and other garments including the CF SBL material.

Example 3
Effect of Preheating VF SBL Material on Ultrasonic Bond Strength

The VF SBL material comprises elastic polymer filaments disposed between two spunbond facing layers, as described in EXAMPLE 1, above.

The VF SBL specimens were preheated or precooled between two brass blocks and then ultrasonically bonded using the Branson plunge bonder. The preheating (precooling) temperature was controlled in these specimens by equilibrating the elastic laminate preheating temperature between the brass blocks held at the desired temperature. The specimens were slipped from between the two brass blocks directly into position to be plunge bonded. The time delay was less than 1 second, so the preheating temperature should be accurate to within a few degrees. Each specimen was plunge bonded and the ultrasonic bond was tested for bond strength using the test procedure for measuring seam bond strength described above. TABLE 3 displays the average results of the bond strength testing for the VF SBL material, measured in kg.

TABLE 3

AVERAGE ULTRASONIC BOND STRENGTH (KG)

| Bond Time (msec) | 40° F. | 70° F. | 100° F. | 130° F. |
|---|---|---|---|---|
| 70 | 1.6 | 2.1 | 3.2 | 4.0 |
| 75 | 2.2 | 3.3 | 4.7 | 5.4 |
| 80 | 3.4 | 5.5 | 6.7 | 7.2 |

Figure 7:
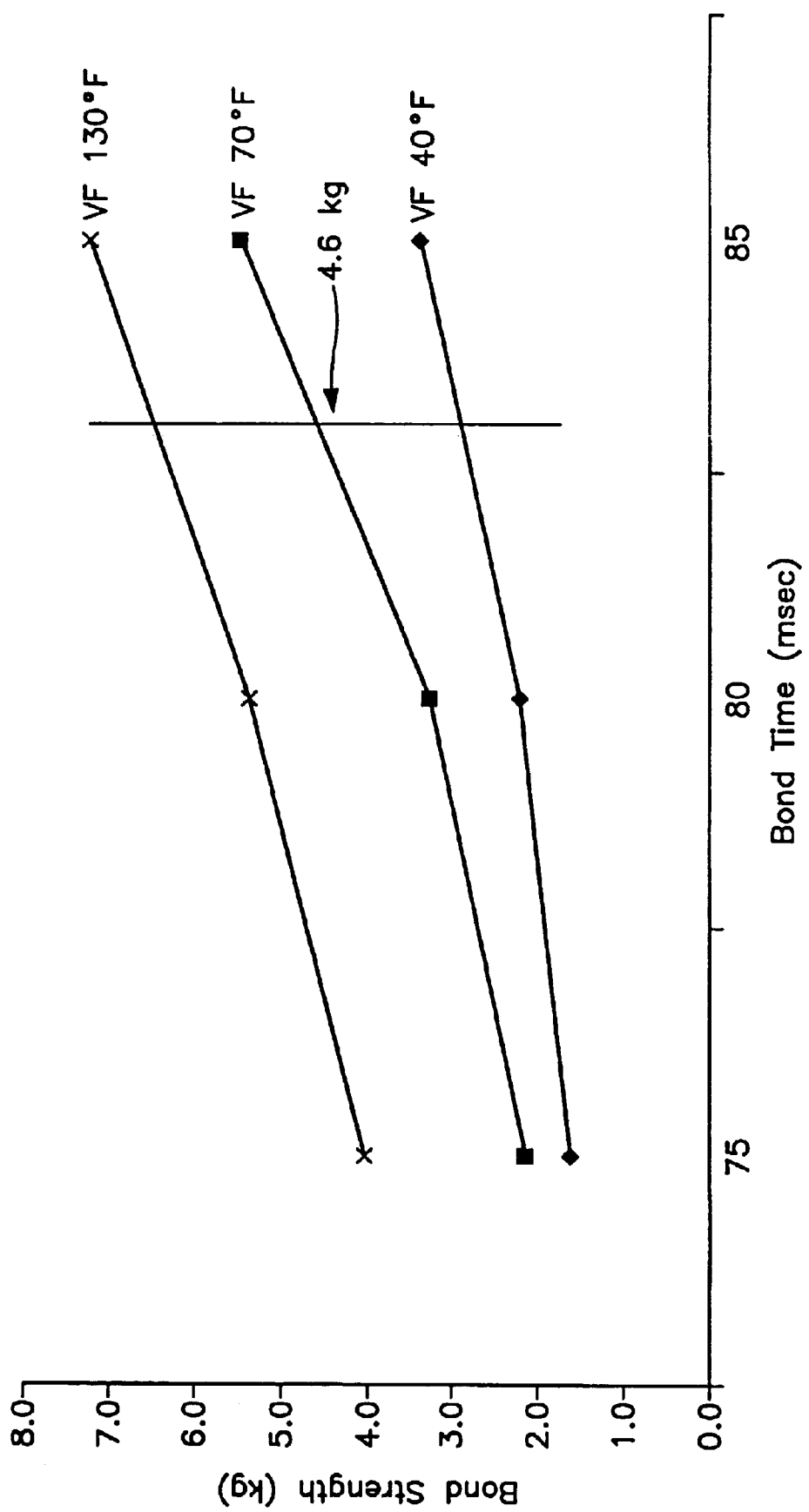

As shown in TABLE 3 and FIG. 7, preheating the VF SBL specimens resulted in a bond strength which consistently improved with increasing temperature and bond time. Further, the bond strength was observed to decrease for specimens cooled from about 70° F. to about 40° F.

Example 4
Effect of Preheating VF SBL Material on Ultrasonic Bond Strength

The VF SBL material comprises elastic polymer filaments disposed between two spunbond facing layers, as described in EXAMPLE 1, above.

Similar to EXAMPLE 3 above, VF SBL elastic laminate specimens were preheated between two brass blocks and then ultrasonically bonded using the Branson plunge bonder. The preheating temperature was controlled in these specimens by equilibrating the elastic laminate preheating temperature between the brass blocks held at the desired temperature. The specimens were slipped from between the two brass blocks directly into position to be plunge bonded. The time delay was less than 1 second, so the preheating temperature should be accurate to within a few degrees. The resulting ultrasonic bonds were tested for bond strength using the test procedure for measuring seam bond strength described above. TABLE 4 below displays the average results of the bond strength testing for the VF SBL material, measured in kg.

TABLE 4

AVERAGE ULTRASONIC BOND STRENGTH (KG)

| Bond Time (msec) | 70° F. | 100° F. | 130° F. | 160° F. | 190° F. | 220° F. | 250° F. |
|---|---|---|---|---|---|---|---|
| 75 | 2.7 | 3.2 | 3.3 | 3.9 | 4.9 | 6.5 | 7.2 |
| 80 | 4.1 | 4.6 | 5.4 | 6.3 | 6.9 | 7.8 | 8.4 |
| 85 | 6.3 | 6.8 | 6.7 | 7.1 | 8.3 | 7.9 | 8.7 |

Figure 8:
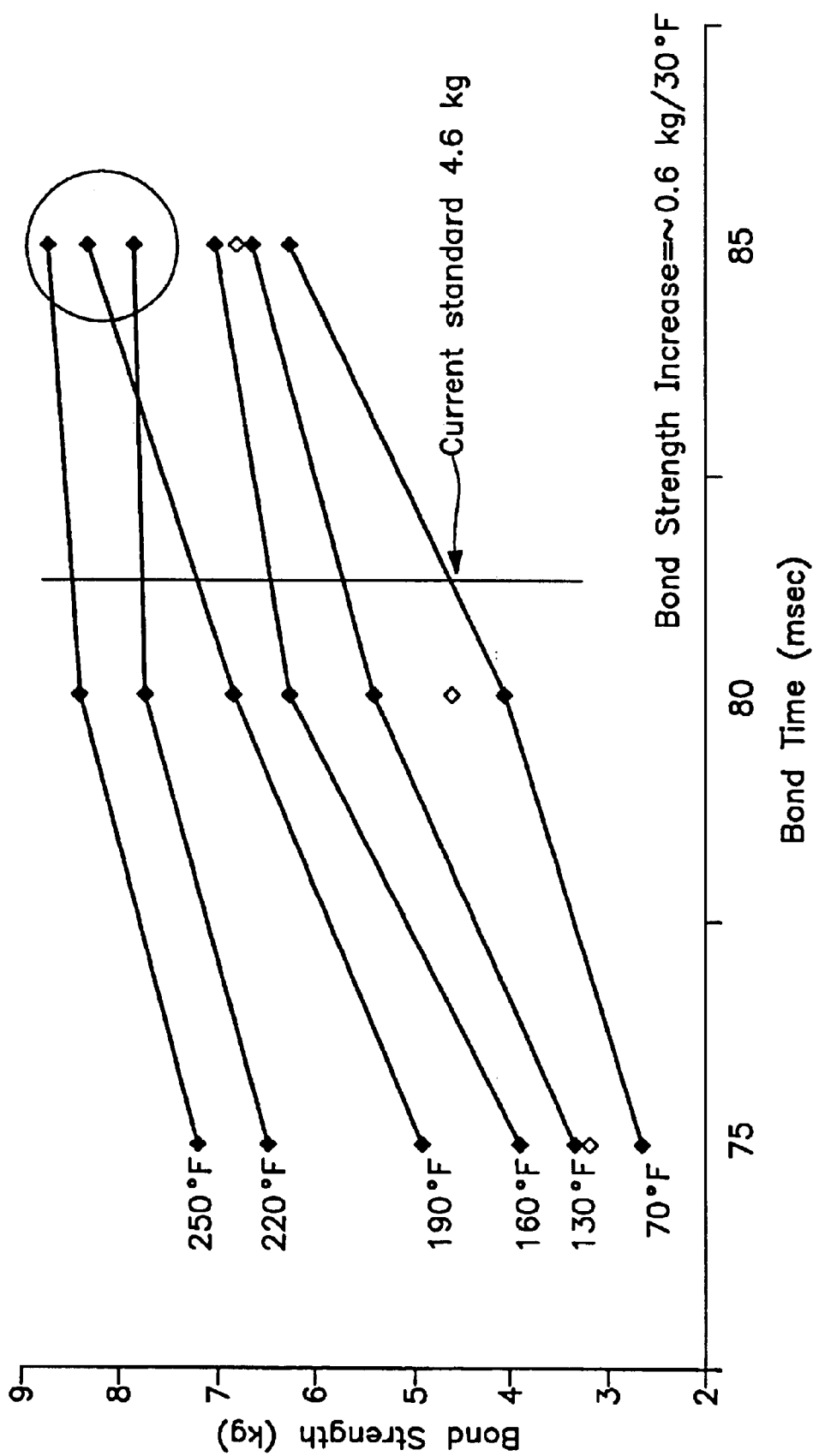

As shown in TABLE 4 and FIG. 8, preheating the VF SBL specimens resulted in a bond strength which consistently improved with increasing temperature and bond time. The bond strength increased about 0.6 kg/30° F. As shown in FIG. 8, the data clearly demonstrate a stepwise increase in bond strength with a stepped increase in the preheating temperature. The data also shows that the greatest bond strength improvement benefit provided by preheating is obtained when the initial bond strength is low. For example, at about 75 msec an initial bond strength of about 2.7 kg was observed. Bond strength increased by about 3.6 kg as a result of preheating the specimen from about 70° F. to about 250° F. At about 85 msec, a smaller increase of about 2.4 kg was observed as a result of preheating the specimen from about 70° F. to about 250° F.

Example 5
Effect of Preheating CF SBL Material on Ultrasonic Bond Strength; BT Rotary Bonder The CF SBL specimens comprise a meltblown web including KRATON® 2760 polymer filaments sandwiched between two polypropylene spunbond webs, as described in EXAMPLE 2.

The CF SBL specimens were preheated between two brass blocks and then ultrasonically bonded using a BT Rotary Bonder designed, engineered and built by Kimberly-Clark Corporation, Neenah, Wis., U.S.A. The preheating temperature was controlled in these specimens by equilibrating the elastic laminate preheating temperature between the brass blocks held at the desired temperature. The specimens were slipped from between the two brass blocks directly into position to be rotary bonded. The resulting ultrasonic bonds were tested for bond strength using the test procedure for measuring seam bond strength described above. TABLE 5 displays the average results of the bond strength testing for the CF SBL material, measured in kg.

TABLE 5

AVERAGE ULTRASONIC BOND STRENGTH (KG)

| Line Speed (ft./min.) | Ambient Temp. (75° F.) | Preheating Temp. (<150° F.) |
|---|---|---|
| 300 | 6.3 | 6.7 |
| 500 | 3.9 | 4.6 |
| 700 | 1.8 | 3.4 |

Figure 9:
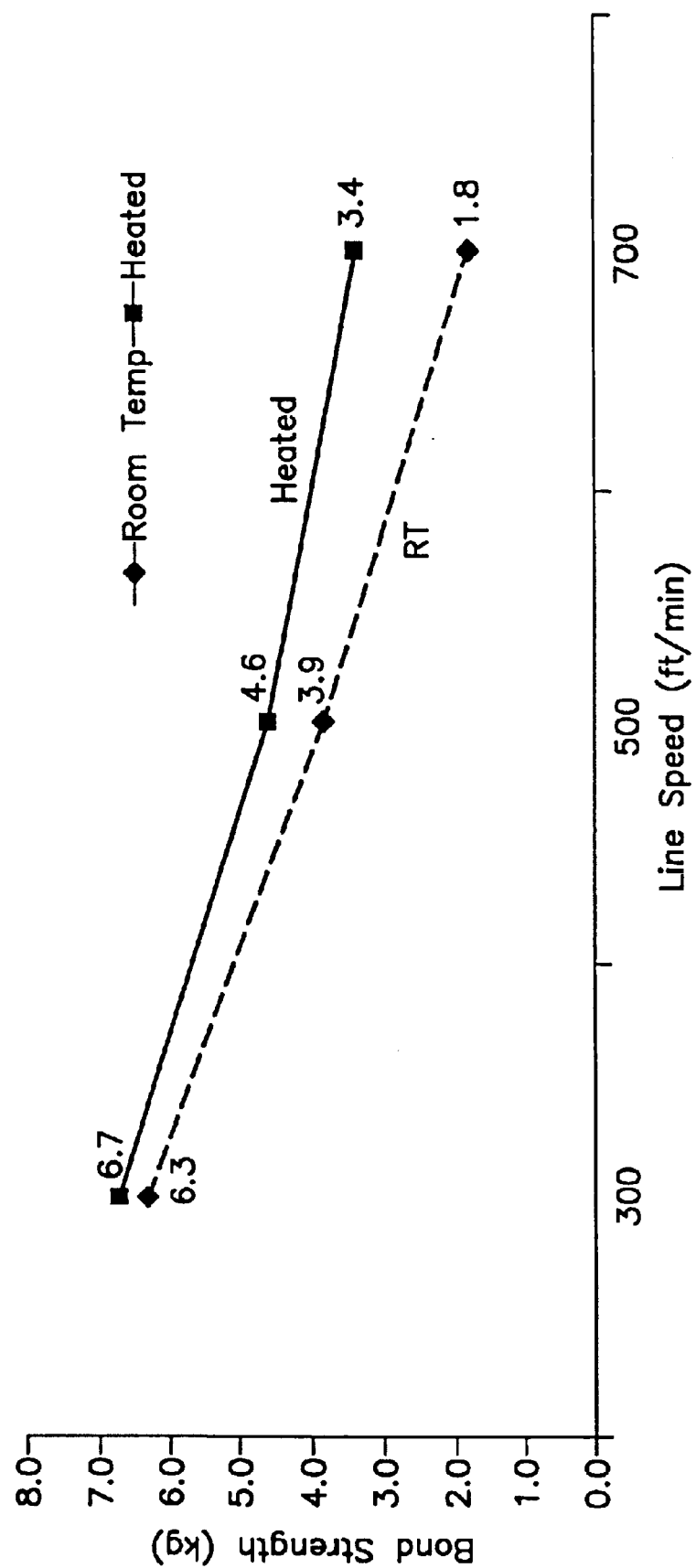

As shown in TABLE 5 and in FIG. 9, the data illustrates that preheating the materials is effective in raising the ultrasonic bond strength of a CF SBL specimen when bonded with a rotary bonder process. The improvement is observed from a moderate line speed of about 300 ft./min. to a much higher line speed of about 700 ft./min. As was observed with plunge bonding, a greater increase in bond strength for a given temperature increase was observed for the case where the initial bond strength was lower. Additionally, because there was a considerable delay between removing the SBL specimens from between the heated blocks, only a relatively small increase in bond strength was observed.

Example 6
Effect of Preheating VF SBL Materials on Ultrasonic Bond Strength; BT Rotary Bonder The VF SBL material comprises elastic polymer filaments disposed between two spunbond facing layers, as described in EXAMPLE 1, above.

The VF SBL specimens were preheated between two brass blocks and then ultrasonically bonded using the BT Rotary Bonder. The preheating temperature was controlled in these specimens by equilibrating the elastic laminate preheating temperature between the brass blocks held at the desired temperature. The specimens were slipped from between the two brass blocks directly into position to be plunge bonded. The resulting ultrasonic bonds were tested for bond strength using the test procedure for measuring seam bond strength described above. TABLE 6 displays the average results of the bond strength testing for the VF SBL material, measured in kg.

TABLE 6

AVERAGE ULTRASONIC BOND STRENGTH (KG)

| Line Speed (ft./min.) | Ambient Temp. (75° F.) | Preheating Temp. (<150° F.) |
|---|---|---|
| 300 | 5.7 | 5.8 |
| 500 | 2.2 | 3.3 |
| 700 | 1.1 | 2.2 |

Figure 10:
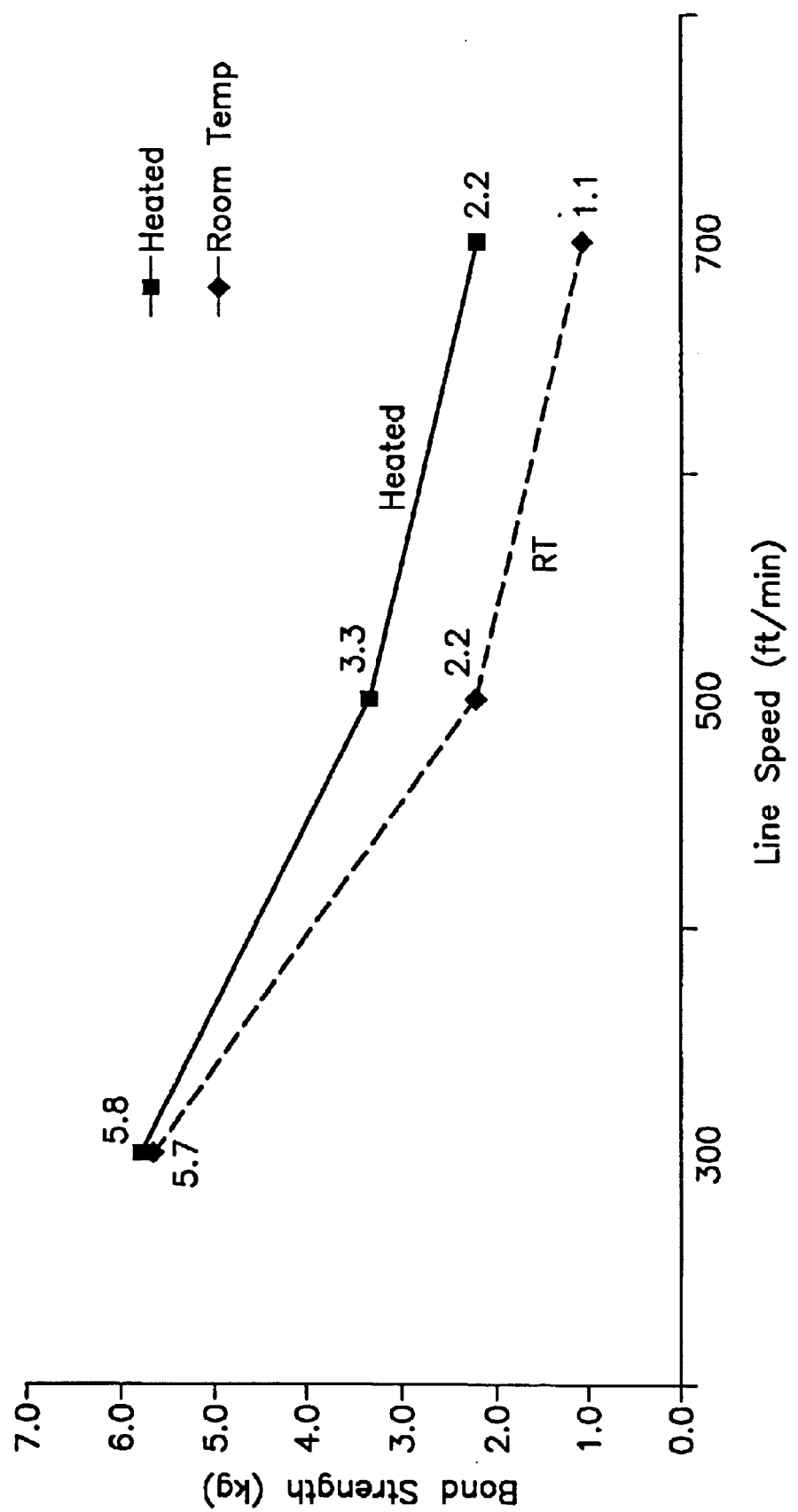

As shown in TABLE 6 and in FIG. 10, the data illustrates that preheating the materials is effective in raising the ultrasonic bond strength of a VF SBL specimen when bonded with a rotary bonder process. The improvement is observed from a moderate line speed of about 300 ft./min. to a much higher line speed of about 700 ft./min. As was observed with plunge bonding, a greater increase in bond strength for a given temperature increase was observed for the case where the initial bond strength was lower. Additionally, because there was a considerable delay between removing the SBL specimens from between the heated blocks, only a relatively small increase in bond strength was observed.

Example 7
4.8 osy Spunbond Material Over Four Preheating Temperatures @ 2 Bond Times Polypropylene spunbond substrate specimens were preheated between two brass blocks at four preheating temperatures and ultrasonically bonded using the Branson plunge bonder, at two bond times. The resulting ultrasonic bonds were tested for bond strength using the test procedure for measuring seam bond strength described above. TABLE 7 displays the average results of the bond strength testing for the spunbond material, measured in kg.

TABLE 7

AVERAGE ULTRASONIC BOND STRENGTH (KG)

| Preheating Temp. (° F.) | Bond Time, 70 msec | Bond Time, 75 msec |
|---|---|---|
| 70 | 0.9 | 3.0 |
| 100 | 1.4 | 4.1 |
| 130 | 1.8 | 3.7 |
| 250 | 6.5 | 8.7 |

Figure 11:
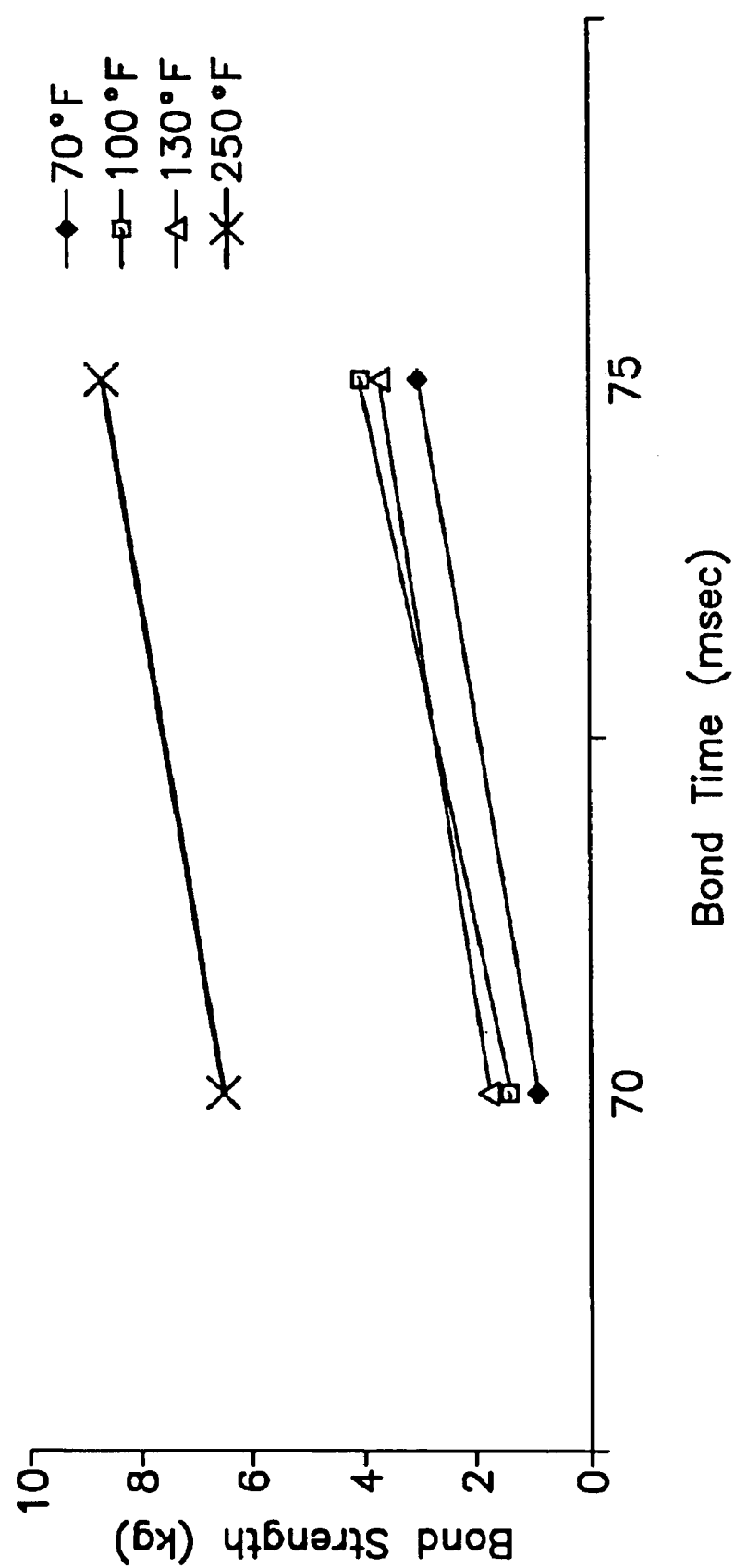

As shown in TABLE 7 and in FIG. 11, the data illustrates that the positive effect of preheating materials on ultrasonic bond strength extends to include materials in addition to elastic SBL materials, for example polypropylene spunbond materials.

Example 8

Code A1 included elastic panel specimens comprising a CF SBL material, as described in EXAMPLE 2, above. Code A2 included elastic panel specimens comprising a VF SBL material, as described in EXAMPLE 1, above. Codes A1 and A2 were Control Codes, and, thus, were not preheated prior to ultrasonic bonding.

Code B1 included elastic panel specimens comprising a CF SBL material, as described in EXAMPLE 2, above. Code B2 included elastic panel specimens comprising a VF SBL material, as described in EXAMPLE 1, above. Codes B1 and B2 were preheated with hot air prior to rotary ultrasonic bonding. The hot air preheating consisted of hot air from three heaters positioned about 24 inches upstream from the ultrasonic bonder nip to preheat Codes B1 and B2 to a preheating temperature of about 120° F. prior to ultrasonic bonding. The line speed was about 475 ft./min. and, thus, the three heaters were positioned about 0.2 seconds from the heat zone of the nip.

Code C1 included elastic panel specimens comprising a CF SBL material, as described in EXAMPLE 2, above. Code C2 included elastic panel specimens comprising a VF SBL material, as described in EXAMPLE 1, above. Codes C1 and C2 were positioned between two heated brass blocks and preheated to a preheating temperature of about 120° F. prior to ultrasonic bonding.

Code D1 included elastic panel specimens comprising a CF SBL material, as described in EXAMPLE 2, above. Code D2 included elastic panel specimens comprising a VF SBL material, as described in EXAMPLE 1, above. Codes D1 and D2 were positioned between two heated brass blocks and preheated to a preheating temperature of about 120° F. and then passed under the hot air stream prior to ultrasonic bonding.

The ultrasonic seam of each of ten specimens was tested for bond strength using the test procedure for measuring seam bond strength, described above. TABLE 8 and TABLE 9 display the results of the bond strength testing for the CF SBL material and the VF SBL material, respectively. The last row for each column represents the average ultrasonic bond strength for each Code.

TABLE 8

ULTRASONIC BOND STRENGTH (KG) FOR CF SBL MATERIALS

| A1 | B1 | C1 | D1 |
|---|---|---|---|
| 4.7 | 3.5 | 5.0 | 4.7 |
| 4.4 | 5.0 | 4.4 | 5.5 |
| 3.8 | 4.0 | 5.0 | 5.5 |
| 4.3 | 3.1 | 4.8 | 5.0 |
| 4.2 | 3.8 | 5.0 | 4.2 |
| 4.8 | 5.5 | 4.2 | 5.0 |
| 4.6 | 4.9 | 4.2 | 4.8 |
| 3.4 | 5.0 | 4.9 | 4.4 |
| 4.3 | 4.4 | 5.9 | 4.7 |
| 4.7 | 4.4 | 4.7 | 5.0 |
| 4.3 (Avg.) | 4.4 (Avg.) | 4.8 (Avg.) | 4.9 (Avg.) |

TABLE 9

ULTRASONIC BOND STRENGTH (KG) FOR VF SBL MATERIALS

| A2 | B2 | C2 | D2 |
|---|---|---|---|
| 3.9 | 4.1 | 3.4 | 4.6 |
| 3.5 | 4.0 | 4.1 | 4.7 |
| 3.7 | 3.7 | 4.4 | 4.3 |
| 3.7 | 3.5 | 3.8 | 4.2 |
| 3.8 | 3.8 | 4.3 | 4.8 |
| 3.8 | 3.5 | 4.0 | 4.3 |
| 3.5 | 3.6 | 4.3 | 4.0 |
| 3.6 | 3.6 | 4.2 | 3.8 |
| 3.5 | 4.0 | 3.4 | 4.4 |
| 3.5 | 3.7 | 4.5 | 4.6 |
| 3.7 (Avg.) | 3.8 (Avg.) | 4.0 (Avg.) | 4.4 (Avg.) |

Figure 12:
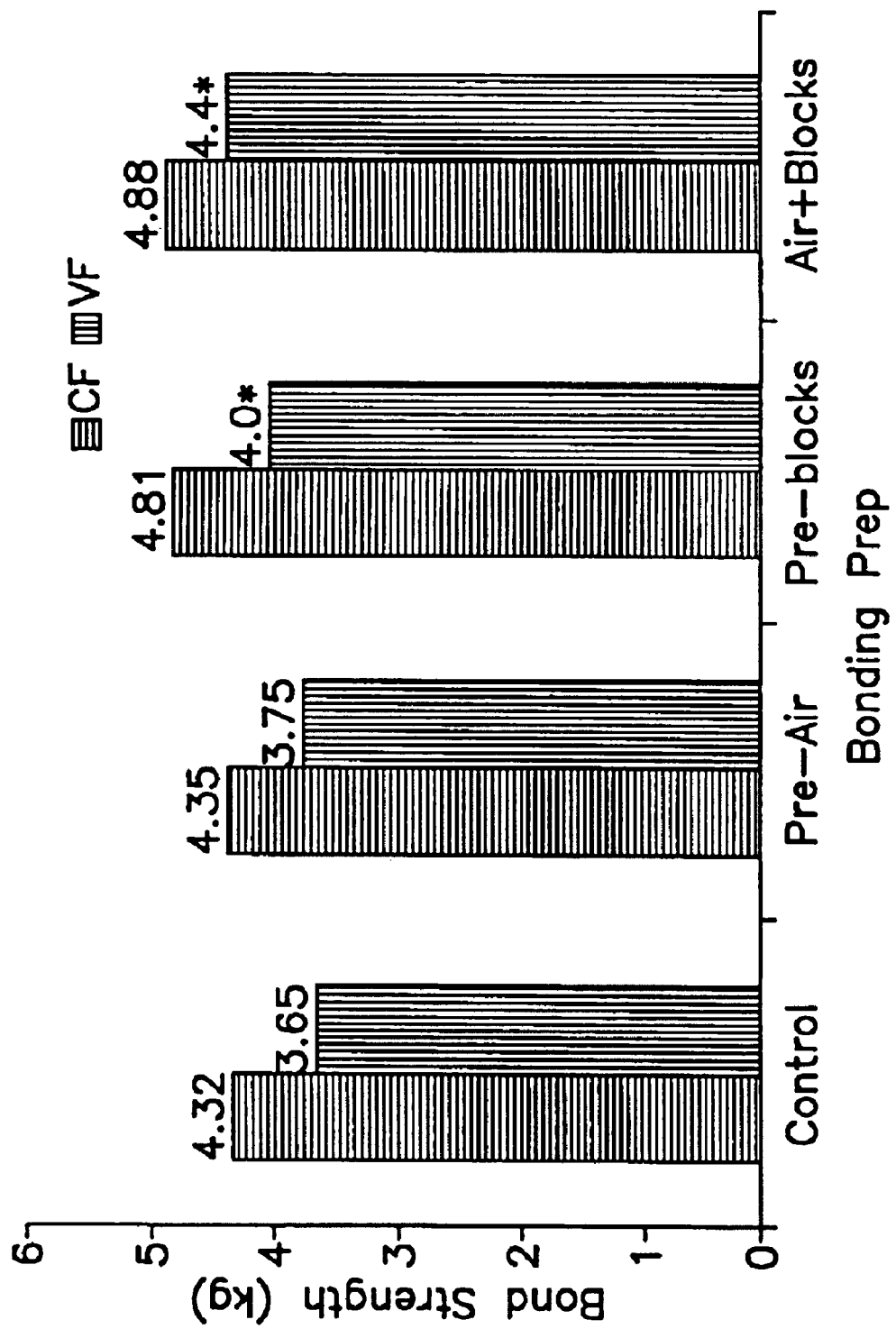

As shown in FIG. 12, an average improvement of about 0.1 kg was observed with the application of hot air from the three heaters positioned upstream from the ultrasonic bonder nip. Further, preheating the elastic panels to about 120° F. between the brass blocks appears to be more effective in improving the bond strength of the ultrasonic bonds, with an average improvement over the Control Code of about 0.5 kg for the CF SBL material and about 0.3 kg for the VF SBL material. Preheating the materials between the brass blocks and then passing the materials under the hot air stream appears to provide an increase in bond strength compared to preheating the elastic panels using either the brass blocks or the hot air stream.

Example 9

Elastic panel specimens comprising a VF SBL material including about 2.5 gsm adhesive were obtained. The Control Code was not preheated but was passed through the ultrasonic bonding apparatus to form an ultrasonically bonded seam. Code A was preheated using an ultrasonic preheating unit comprising an ultrasonic horn and a smooth, steel anvil prior to passing the material through the ultrasonic bonding apparatus. Code B was passed through the ultrasonic preheating unit, wherein pressure was applied to Code B to compress the materials as the materials passed through the ultrasonic nip. However, the ultrasonic mechanism of the ultrasonic preheating unit was not activated. Each of the Control Code, Code A and Code B was tested at line speeds of about 475 ft./min., 600 ft./min. and 700 ft./min.

The seam of each specimen was tested for bond strength using the test procedure for measuring seam bond strength described above. TABLE 10 and TABLE 11 display the average results of the bond strength testing for the VF SBL materials including about 2.5 gsm adhesive with the ultrasonic mechanism of the ultrasonic preheating unit activated and deactivated, respectively.

TABLE 10

ULTRASONIC BOND STRENGTH (KG) FOR VF SBL MATERIALS @ 2.5 GSM ADHESIVE

| CODE | 475 ft./min. | 600 ft./min. | 700 ft./min. |
| --- | --- | --- | --- |
| Control | 4.5 | 3.8 | 3.4 |
| A | 5.7 | 5.1 | 4.7 |

TABLE 11

ULTRASONIC BOND STRENGTH (KG) FOR VF SBL MATERIALS @ 2.5 GSM ADHESIVE

| CODE | 475 ft./min. | 600 ft./min. |
| --- | --- | --- |
| Control | 4.8 | 3.6 |
| B (pressure only) | 4.8 | 3.8 |

Elastic panel specimens comprising a VF SBL material including about 3.0 gsm adhesive were obtained. The Control Code was not preheated but was passed through the ultrasonic bonding apparatus to form an ultrasonically bonded seam. Code C was preheated using the ultrasonic preheating unit comprising an ultrasonic horn and a smooth, steel anvil prior to passing the material through the ultrasonic bonding apparatus. Code D was passed through the ultrasonic preheating unit, wherein pressure was applied to Code D to compress the materials as the materials passed through the ultrasonic nip. However, the ultrasonic mechanism of the ultrasonic preheating unit was not activated. Each of the Control Code and Code C was tested at line speeds of about 475 ft./min., 600 ft./min. and 700 ft./min. Code D was tested at a line speed of about 475 ft./min.

The seam of each specimen was tested for bond strength using the test procedure for measuring seam bond strength described above. TABLE 12 and TABLE 13 display the average results of the bond strength testing for the VF SBL materials including about 3.0 gsm adhesive with the ultrasonic mechanism of the ultrasonic preheating unit activated and deactivated, respectively.

TABLE 12

ULTRASONIC BOND STRENGTH (KG) FOR VF SBL MATERIALS @ 3.0 GSM ADHESIVE

| CODE | 475 ft./min. | 600 ft./min. | 700 ft./min. |
| --- | --- | --- | --- |
| Control | 4.4 | 3.9 | 3.6 |
| C | 5.0 | 4.9 | 4.6 |

TABLE 13

ULTRASONIC BOND STRENGTH (KG) FOR VF SBL MATERIALS @ 3.0 GSM ADHESIVE

| CODE | 475 ft./min. |
| --- | --- |
| Control | 3.7 |
| D (pressure only) | 3.7 |

Figure 13:
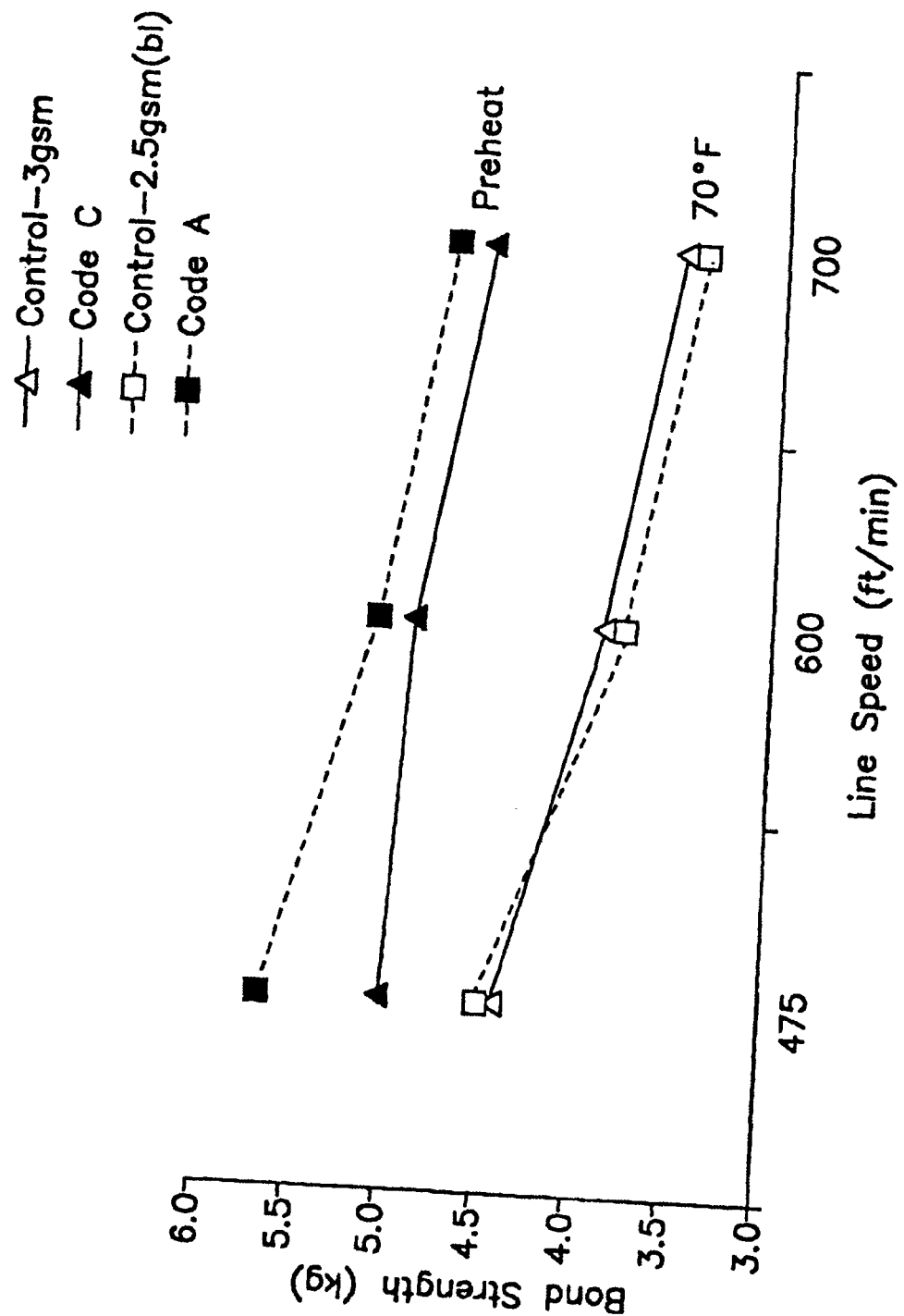

As shown in FIG. 13, when the materials, which comprise a VF SBL material including about 2.5 gsm adhesive to about 3.0 gsm adhesive, are preheated using a rotary ultrasonic bonding apparatus having an ultrasonic horn and a smooth, steel anvil, prior to ultrasonic bonding, the bond strength of the resulting ultrasonic bonds forming the seams are significantly stronger than the bond strength of the ultrasonic bonds forming the seams of the control specimens.

Elastic panel specimens comprising a CF SBL material were obtained. The Control Code was not preheated but was passed through the ultrasonic bonding apparatus to form an ultrasonically bonded seam. Code E was preheated using an ultrasonic preheating unit comprising an ultrasonic horn and a smooth, steel anvil prior to passing the material through the ultrasonic bonding apparatus. The Control Code and Code E were tested at line speeds of about 475 ft./min. and 600 ft./min.

The seam of each specimen was tested for bond strength using the test procedure for measuring seam bond strength described above. TABLE 14 displays the average results of the bond strength testing for the CF SBL materials.

TABLE 14

ULTRASONIC BOND STRENGTH (KG) FOR CF SBL MATERIALS

| CODE | 475 ft./min. | 600 ft./min. |
| --- | --- | --- |
| Control | 5.3 | 4.6 |
| E | 5.9 | 5.4 |

It can be observed from the results that preheating SBL materials effectively increases ultrasonic bond strength in both the VF SBL material and the CF SBL material. Further, it is observed that pressure alone (from the ultrasonic preheating unit) appears to be ineffective toward measurably raising the ultrasonic bond strength.

Example 10
Aliphatic Polyester and Plasticized Aliphatic Polyester Materials Specimens including two materials each comprising an aliphatic polyester substrate in the form of a spunbond material having a basis weight of about 26 gsm were preheated between two brass blocks to various temperatures ranging from about 70° F. to about 290° F. The preheating temperature was controlled in these specimens by equilibrating the specimen preheating temperature between the brass blocks held at the desired temperature. The specimens were slipped from between the two brass blocks directly into position to be plunge bonded. The time delay was less than 1 second, so the preheating temperature should be accurate to within a few degrees. The preheated materials were then passed through an ultrasonic bonding apparatus comprising a plunge bonder, wherein the materials were ultrasonically bonded to form a seam. The bonding time was set at about 50 msec.

The seam of each specimen was tested for bond strength using the test procedure for measuring bond strength described above. TABLE 15 displays the average results of the bond strength testing for the aliphatic polyester materials, measured in kg.

TABLE 15

ULTRASONIC BOND STRENGTH (KG) FOR ALIPHATIC POLYESTER MATERIALS Plunge Bonded, 50 msec.

| Temperature, ° F. | 70 | 160 | 250 | 290 |
|---|---|---|---|---|
| Bond Strength, kg | 1.0 | 1.3 | 1.9 | 2.2 |

Figure 14:
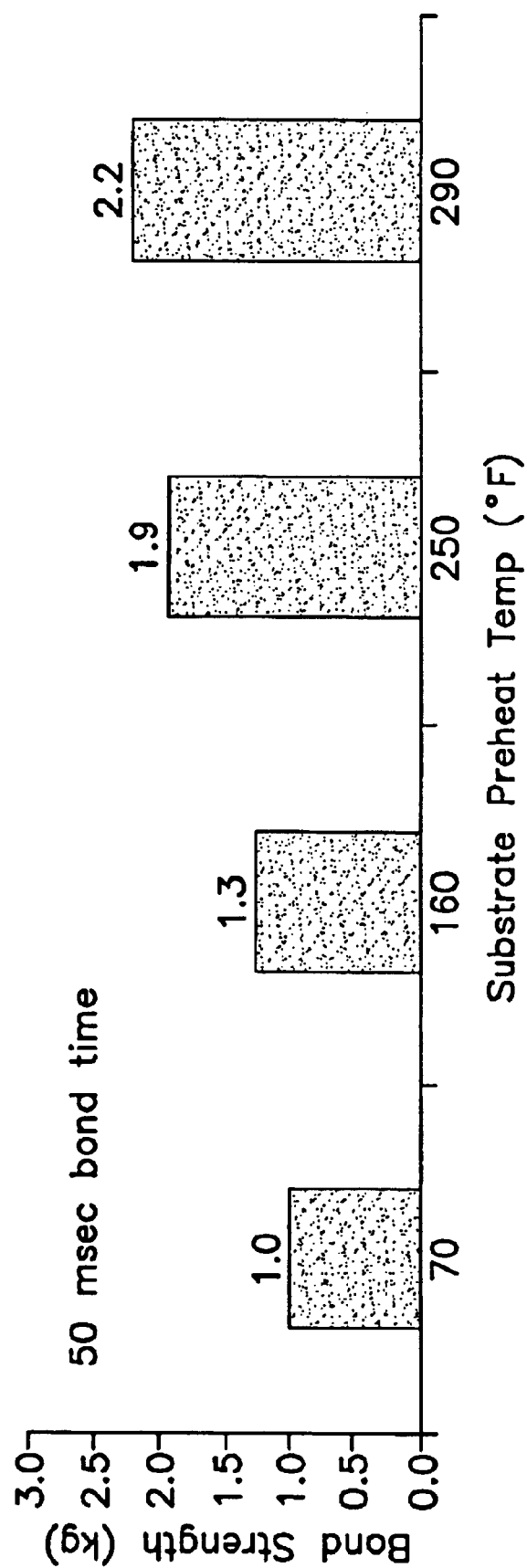

As shown in FIG. 14, the average bond strength of the resulting ultrasonic bond increases as the preheating temperature increases.

Similarly, specimens including two materials each comprising a plasticized aliphatic polyester substrate in the form of a spunbond material having a basis weight of about 29 gsm were preheated between two brass blocks to various temperatures ranging from about 70° F. to about 290° F. The preheating temperature was controlled in these specimens by equilibrating the specimen preheating temperature between the brass blocks held at the desired temperature. The specimens were slipped from between the two brass blocks directly into position to be plunge bonded. The time delay was less than 1 second, so the preheating temperature should be accurate to within a few degrees. The preheated materials were then passed through an ultrasonic bonding apparatus comprising a plunge bonder, wherein the materials were ultrasonically bonded to form a seam. The bonding time was set at about 50 msec.

The seam of each specimen was tested for bond strength using the test procedure for measuring bond strength described above. TABLE 16 displays the average results of the bond strength testing for the plasticized aliphatic polyester materials, measured in kg.

TABLE 16

ULTRASONIC BOND STRENGTH (KG) FOR PLASTICIZED ALIPHATIC POLYESTER MATERIALS Plunge Bonded, 50 msec.

| Temperature, ° F. | 70 | 160 | 290 |
|---|---|---|---|
| Bond Strength, Kg | 0.4 | 1.5 | 2.7 |

Figure 15:
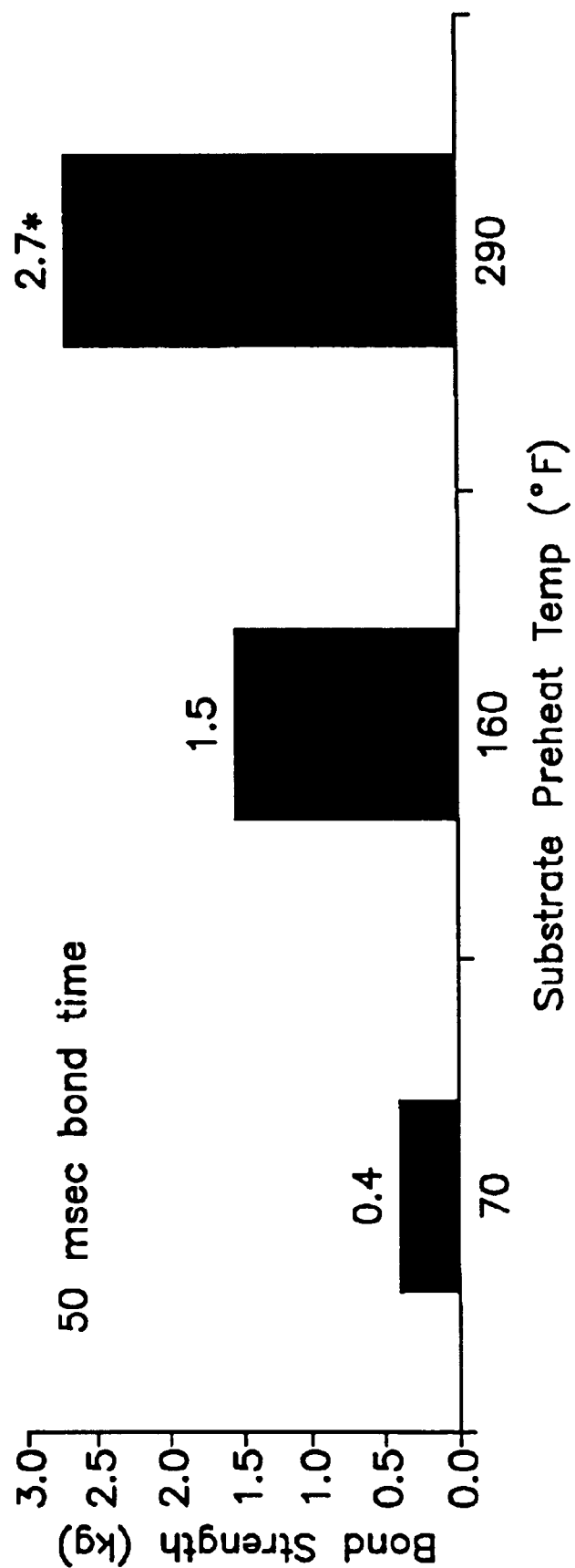

As shown in FIG. 15, the average bond strength of the resulting ultrasonic bond increases as the preheating temperature increases.

It can be observed from the results of Example 10 that preheating polyester materials, for example aliphatic polyester materials and plasticized polyester materials, effectively increases ultrasonic bond strength when the materials are bonded to form a seam. Further, Example 10 demonstrates that preheating the substrates in accordance with the method of this invention to improve the ultrasonic bond strength, is applicable to polyester chemistry as well as polyolefin chemistry.

In other words, it demonstrates that the preheating method is applicable over a wide range of substrate chemistries, and it is intended that the methods of the present invention can be used to bond any materials capable of being ultrasonically bonded together.

Example 11
Polypropylene Film and Polypropylene Spunbond Materials

Specimens comprising at least one polypropylene film and/or at least one polypropylene (PP) spunbond material were preheated between two brass blocks to various temperatures ranging from about 70° F. to about 200° F. The polypropylene film has a basis weight of about 34 gsm and the polypropylene spunbond material has a basis weight of about 20 gsm. The preheating temperature was controlled in these specimens by equilibrating the specimen preheating temperature between the brass blocks held at the desired temperature. The specimens were slipped from between the two brass blocks directly into position to be plunge bonded. The specimens were ultrasonically bonded using a Branson 931 AES, Ultrasonic Stationary Plunge Bonder, available from Branson Ultrasonic Corporation located in Danbury, Conn., U.S.A., having a bond length of about 3 inches and a bond pressure of about 75 psi. The bonding time was set at about 75 msec.

Each specimen was plunge bonded and the ultrasonic bond was tested for bond strength using the test procedure for measuring seam bond strength described above. TABLE 17 displays the average results of the bond strength testing for the polypropylene materials, measured in kg.

For the film/film specimens, a first composite film including three layers of 34 gsm film having a total basis weight of about 102 gsm were bonded to a second composite film including three layers of 34 gsm film having a total basis weight of about 102 gsm. The composite films were peeled apart to obtain the following reported average bond strengths. Multiple layers of film were required to avoid overbonding by the plunge bonder.

For the film/spunbond specimens, a composite film including three layers of 34 gsm film having a total basis weight of about 102 gsm was bonded to a composite spunbond material including two layers of 20 gsm spunbond material having a total basis weight of about 40 gsm. The composite film and composite spunbond material were peeled apart to obtain the following reported average bond strengths. Multiple layers of film and spunbond material were required to avoid overbonding by the plunge bonder.

TABLE 17

ULTRASONIC BOND STRENGTH (KG)
FOR POLYPROPYLENE MATERIALS
Plunge Bonded, 75 msec.

| | | |
|---|---|---|
| Preheating Temperature, ° F. | 70 | 200 |
| PP Film to PP Film Bond Strength, kg | 2.2 | 4.9 |
| PP Film to PP Spunbond Bond Strength, kg | 0.4 | 1.4 |

It can be observed from the results of Example 11 that preheating films and spunbond materials, for example polypropylene films and polypropylene spunbond materials, prior to ultrasonic bonding results in higher bond strengths from the subsequent ultrasonic bonding process.

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the following claims and all equivalents thereto. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

We claim:

1. A method for ultrasonically bonding thermoplastic materials, the method comprising:
   preheating one or more thermoplastic materials in an ultrasonic preheating unit, the ultrasonic preheating unit forming a nip between an ultrasonic horn and a smooth anvil, the ultrasonic horn being in contact with a first surface of a first thermoplastic material of the thermoplastic materials;
   subsequently feeding the thermoplastic materials through an ultrasonic bonding apparatus; and
   ultrasonically bonding the preheated first thermoplastic material to at least one second thermoplastic material of the thermoplastic materials to form an ultrasonic bond.

2. The method of claim 1 wherein the preheating step is performed by a preheating unit and the ultrasonic bonding step is performed by a separate ultrasonic bonding apparatus.

3. The method of claim 1 wherein the first material is preheated to a temperature of about 130° F. to about 250° F.

4. The method of claim 1 wherein the first material is preheated to a temperature of about 160° F. to about 250° F.

5. The method of claim 1 wherein the preheated first material is ultrasonically bonded to the second material using a plunge ultrasonic bonder.

6. The method of claim 1 wherein the preheated first material is ultrasonically bonded to the second material using a rotary ultrasonic bonder.

7. The method of claim 1 wherein during the preheating step the first thermoplastic material passes through the ultrasonic preheating unit at a production line speed of greater than about 300 ft./min.

8. The method of claim 1 wherein during the preheating step the first thermoplastic material passes through the ultrasonic preheating unit at a production line speed of greater than about 500 ft./min.

9. The method of claim 8 wherein the ultrasonic bond has a bond strength of about 1.0 kg to about 10.0 kg.

10. The method of claim 1 wherein at least one of the first material and the second material comprises a SBL material.

11. The method of claim 1 wherein at least one of the first material and the second material comprises a film.

12. The method of claim 1 wherein the thermoplastic materials comprise materials selected from the group consisting of polyolefin materials and polyester materials.

13. A method for ultrasonically bonding thermoplastic materials, the method comprising:
   preheating at least a first thermoplastic material;
   subsequently feeding the first thermoplastic material and at least one second thermoplastic material through an ultrasonic bonding apparatus; and
   ultrasonically bonding the preheated first thermoplastic material to the at least one second thermoplastic material to form an ultrasonic bond wherein the first thermoplastic material has a first bonding region and a second bonding region, the first bonding region being preheated to a first temperature and the second bonding region being preheated to a second temperature different than the first temperature, wherein a first portion of the ultrasonic bond corresponding to the first bonding region is stronger than a second portion of the ultrasonic bond corresponding to the second bonding region.

14. A method for bonding at least a portion of two thermoplastic materials together, the method comprising:
   feeding the two thermoplastic materials into an ultrasonic preheating unit at a first production line speed, the ultrasonic preheating unit forming a nip between an ultrasonic horn and a smooth anvil, the ultrasonic horn being in contact with a first surface of one of the two thermoplastic materials;
   preheating the two thermoplastic materials to a preheating temperature;
   subsequently feeding the two thermoplastic materials into a separate ultrasonic bonding unit; and
   ultrasonically bonding at least a portion of the preheated thermoplastic materials together to form an ultrasonic bond.

15. The method of claim 14 wherein at least one of the two thermoplastic materials comprise an elastic laminate material.

16. The method of claim 14 wherein the two thermoplastic materials pass through the nip of the ultrasonic preheating unit formed between the ultrasonic horn and a smooth anvil, thereby compressing each of the two thermoplastic materials.

17. The method of claim 14 wherein the first production line speed is greater than about 300 ft./min.

18. The method of claim 14 wherein the first production line speed is greater than about 500 ft./min.

19. The method of claim 14 wherein the preheating temperature is at least about 130° F.

20. The method of claim 14 wherein the preheating temperature is at least about 160° F.

21. The method of claim 14 wherein the ultrasonic bond has an increase in bond strength greater than about 0.2 kg.

22. The method of claim 14 wherein the ultrasonic bond has an increase in bond strength greater than about 0.4 kg.

23. The method of claim 14 wherein at least one of the first material and the second material comprises a film.

24. A method for bonding a first thermoplastic material to a second thermoplastic material to form a garment, the method comprising:

feeding the first thermoplastic material and the second thermoplastic material through an ultrasonic preheating unit, the ultrasonic preheating unit forming a nip between an ultrasonic horn and a smooth anvil, the ultrasonic horn being in contact with a first surface of the first thermoplastic material, thereby ultrasonically preheating the first thermoplastic material and the second thermoplastic material;

feeding the first thermoplastic material and the second thermoplastic material through an ultrasonic bonder; and ultrasonically bonding the first thermoplastic material and the second thermoplastic material to form a garment.

25. The method of claim 24 wherein the first thermoplastic material comprises a first side panel and the second thermoplastic material comprises a second side panel.

26. The method of claim 24 wherein the first and second materials each comprises an elastic laminate material.

27. The method of claim 24 wherein the preheated first thermoplastic material is ultrasonically bonded to the preheated second thermoplastic material using a rotary ultrasonic bonding apparatus.

28. The method of claim 24 wherein the garment comprises a disposable personal care garment.

29. An apparatus for bonding two thermoplastic materials comprising:

an ultrasonic preheating unit, the ultrasonic preheating unit forming a nip between an ultrasonic horn and a smooth anvil, the ultrasonic horn being in contact with a first surface of one of the two thermoplastic materials; and a separate ultrasonic bonding unit.

30. The apparatus of claim 29 wherein at least one of the two thermoplastic materials are preheated to a temperature of at least about 130° F.

31. An apparatus for bonding at least two thermoplastic materials comprising:

a first unit having means for ultrasonically preheating at least one of the at least two thermoplastic materials, the first unit having a nip formed between an ultrasonic horn and a smooth anvil, the ultrasonic horn being in contact with a first surface of one of the at least two thermoplastic materials; and a second unit having means for ultrasonically bonding the at least two thermoplastic materials.

32. The method of claim 1 wherein the second thermoplastic material is preheated in the ultrasonic preheating unit.

* * * * *